United States Patent
Hou et al.

(10) Patent No.: US 12,192,971 B2
(45) Date of Patent: Jan. 7, 2025

(54) PHYSICAL DOWNLINK CONTROL CHANNEL PDCCH TRANSMISSION METHOD AND APPARATUS

(71) Applicant: Huawei Technologies Co., Ltd., Shenzhen (CN)

(72) Inventors: Hailong Hou, Beijing (CN); Chaojun Li, Beijing (CN); Liyan Su, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 366 days.

(21) Appl. No.: 17/677,674

(22) Filed: Feb. 22, 2022

(65) Prior Publication Data
US 2022/0182991 A1     Jun. 9, 2022

Related U.S. Application Data

(63) Continuation of application No. PCT/CN2020/110553, filed on Aug. 21, 2020.

(30) Foreign Application Priority Data

Aug. 23, 2019   (CN) .......................... 201910786388.5

(51) Int. Cl.
*H04W 72/044* (2023.01)
*H04L 1/08* (2006.01)
(Continued)

(52) U.S. Cl.
CPC ............. *H04W 72/044* (2013.01); *H04L 1/08* (2013.01); *H04L 1/189* (2013.01); *H04L 5/0039* (2013.01);
(Continued)

(58) Field of Classification Search
CPC ............... H04W 72/044; H04W 72/21; H04W 72/0446; H04W 72/0453; H04W 72/23;
(Continued)

(56) References Cited

U.S. PATENT DOCUMENTS

2014/0307695 A1* 10/2014 Yang ..................... H04W 72/20
                                                                      370/329
2019/0069285 A1*  2/2019 Chandrasekhar ..... H04W 72/23
(Continued)

FOREIGN PATENT DOCUMENTS

CN       104811263 A      7/2015
CN       104811409 A      7/2015
(Continued)

OTHER PUBLICATIONS

Huawei et al., "PDCCH repetition for URLLC," 3GPP TSG RAN WG1 Meeting #92bis, Sanya, China, R1-1803658, XP051425955, Total 9 pages, 3rd Generation Partnership Project, Valbonne, France (Apr. 16-20, 2018).
(Continued)

*Primary Examiner* — Mounir Moutaouakil
(74) *Attorney, Agent, or Firm* — Leydig, Voit & Mayer, Ltd.

(57) ABSTRACT

A physical downlink control channel PDCCH transmission method and apparatus is provided. The method includes: A network device sends first indication information to a terminal device, where the first indication information may include configuration information of a PDCCH, the configuration information of the PDCCH is used to indicate at least one repeated transmission configuration manner, which includes a first repeated transmission configuration manner. The repeated transmission configuration manner includes at least one of a quantity of repetitions of the PDCCH and an aggregation level that is of the PDCCH and that corresponds
(Continued)

to the quantity of repetitions. The network device may send the PDCCH to the terminal device based on the first repeated transmission configuration manner. According to this method, a sending effect of a PDCCH at a higher aggregation level can be implemented through repeated sending of a plurality of PDCCHs at lower aggregation levels.

20 Claims, 5 Drawing Sheets

(51) Int. Cl.
  *H04L 1/1867* (2023.01)
  *H04L 5/00* (2006.01)
  *H04W 72/0453* (2023.01)
  *H04W 72/23* (2023.01)

(52) U.S. Cl.
  CPC ....... *H04W 72/0453* (2013.01); *H04W 72/23* (2023.01)

(58) Field of Classification Search
  CPC ....... H04L 1/08; H04L 1/0046; H04L 1/0072; H04L 5/0039; H04L 1/1887; H04L 1/1893; H04L 1/1896; H04L 5/0053; H04L 1/189; H04L 5/003; H04L 1/0038; H04L 1/1607
  See application file for complete search history.

(56) References Cited

U.S. PATENT DOCUMENTS

| | | | |
|---|---|---|---|
| 2020/0008235 A1* | 1/2020 | Sarkis | H04L 5/0055 |
| 2020/0221428 A1* | 7/2020 | Moon | H04B 7/024 |
| 2022/0182991 A1* | 6/2022 | Hou | H04L 1/1896 |

FOREIGN PATENT DOCUMENTS

| | | |
|---|---|---|
| CN | 105659514 A | 6/2016 |
| CN | 107645356 A | 1/2018 |
| CN | 108633007 A | 10/2018 |
| EP | 3098998 A1 | 11/2016 |
| WO | 2016046627 A2 | 3/2016 |

OTHER PUBLICATIONS

Xiaomi, "Discussion on the PDCCH repetition for NR URLLC," 3GPP TSG RAN WG1 Meeting #92bis, Sanya, China, R1-1804944, XP051413343, Total 5 pages, 3rd Generation Partnership Project, Valbonne, France (Apr. 16-20, 2018).

* cited by examiner

PHYSICAL DOWNLINK CONTROL CHANNEL PDCCH TRANSMISSION METHOD AND APPARATUS

CROSS-REFERENCE TO RELATED APPLICATIONS

This application is a continuation of International Application No. PCT/CN2020/110553, filed on Aug. 21, 2020, which claims priority to Chinese Patent Application No. 201910786388.5, filed on Aug. 23, 2019. The disclosures of the aforementioned applications are hereby incorporated by reference in their entireties.

TECHNICAL FIELD

The present disclosure relates to the field of mobile communication technologies, and in particular, to a physical downlink control channel (PDCCH) transmission method and an apparatus.

BACKGROUND

Currently, an aggregation level (AL) of a PDCCH is defined in new radio (NR). The aggregation level is a quantity of control channel elements (CCEs) included in the physical downlink control channel (PDCCH). Currently, there are aggregation levels of the PDCCH: AL-1, AL-2, AL-4, AL-8, and AL-16. When performing blind detection (or referred to as blind detection) on the PDCCH based on a specific PDCCH candidate position configured by a network device, UE needs to perform blind detection based on each possible aggregation level of the PDCCH.

Sending of a PDCCH at a high aggregation level needs to occupy a large quantity of resources. For example, sending of a PDCCH at AL-16 needs to occupy 16 consecutive CCEs in a control resource set (CORESET). Consequently, in some communication scenarios, a sending condition of the PDCCH at the high level may not be met. For example, when a beam bandwidth (BW) on which a terminal operates is 5 MHz and a subcarrier spacing (SCS) of a beam is 15 kHz, or when a BW on which a terminal operates is 10 MHz and a subcarrier spacing SCS of a beam is 30 kHz, one CORESET includes a maximum of three symbols in time domain, and there are a maximum of 12 CCEs in one CORESET. In this case, the PDCCH at AL-16 cannot be sent. Consequently, transmission performance of the PDCCH is reduced. Alternatively, even though a CORESET configured by the network device can be used to send the PDCCH at AL-16 or a PDCCH at another high aggregation level, because a large quantity of consecutive CCEs are occupied for sending the PDCCH, most time-frequency resources in the CORESET may be occupied by a PDCCH used to schedule a same terminal, and congestion occurs during transmission of another PDCCH.

In conclusion, currently, excessive consecutive time-frequency resources are occupied when a terminal is scheduled by using a PDCCH at a high aggregation level. As a result, scheduling performance of the terminal deteriorates and needs to be optimized.

SUMMARY

The present disclosure provides a physical downlink control channel PDCCH transmission method and an apparatus, to optimize a scheduling process of a PDCCH at a high aggregation level.

According to a first aspect, the present disclosure provides a physical downlink control channel PDCCH transmission method. This method may be performed by a network device or a chip in the network device. The network device may include an access network device, for example, a base station or a NodeB.

According to this method, the network device may send first indication information to a terminal device, where the first indication information may include configuration information of a PDCCH, the configuration information is used to indicate at least one repeated transmission configuration manner, and the at least one repeated transmission configuration manner includes a first repeated transmission configuration manner. The network device may further send the PDCCH to the terminal device based on the first repeated transmission configuration manner. The repeated transmission configuration manner includes at least one of a quantity of repetitions of the PDCCH and an aggregation level that is of the PDCCH and that corresponds to the quantity of repetitions.

According to the foregoing method, the network device may schedule the terminal by using a plurality of repeatedly sent PDCCHs, and the terminal performs combined receiving on the repeatedly sent PDCCHs, so that detection performance of the PDCCH is enhanced. In this way, a sending effect of a PDCCH at a higher aggregation level can be implemented through repeated sending of a plurality of PDCCHs at lower aggregation levels. Because each PDCCH at the lower aggregation level occupies less consecutive CCEs than the PDCCH at the higher aggregation level, a quantity of consecutive CCEs occupied when a PDCCH is sent can be reduced, an applicable scenario in which the terminal is scheduled by using the PDCCH at the higher aggregation level is expanded, a probability of PDCCH congestion caused by excessive CCE resources occupied when the terminal is scheduled by using the PDCCH at the higher aggregation level is reduced, and a solution for scheduling the terminal by using the PDCCH at the higher aggregation level is optimized.

It should be understood that the expression "sending a PDCCH" in the present disclosure may also be replaced with "sending DCI through a PDCCH". The expression "receiving a PDCCH" in the present disclosure may also be replaced with "receiving DCI sent through a PDCCH".

For example, the first repeated transmission configuration manner may include a quantity n of repetitions of the PDCCH. The network device may separately send the PDCCH at n time-frequency resource positions, where n is an integer greater than or equal to 2.

The first indication information further includes search space information, where the search space information is used to determine the n time-frequency resource positions. For example, the search space information may include information about the n time-frequency resource positions, for example, an identifier of a search space or an identifier of a search occasion in the search space.

The n time-frequency resource positions may be determined based on at least one search space and at least one control resource set associated with the at least one search space. For example, the n time-frequency resource positions may include n search spaces respectively associated with n control resource sets. Alternatively, for example, the n time-frequency resource positions may include n search spaces in a same control resource set. Alternatively, for another example, the n time-frequency resource positions may include n transmission occasions in a same search space. For example, the n time-frequency resource positions are n consecutive slots in the search space.

According to the foregoing method, the network device may repeatedly transmit the PDCCH at the n time-frequency resource positions, and the terminal device may perform blind detection based on the n time-frequency resource positions, thereby further reducing complexity of blind detection.

When the n time-frequency resource positions are located in different slots, the network device may perform independent channel encoding on each PDCCH. In other words, when the n time-frequency resource positions are located in different slots, the network device may perform independent channel encoding on DCI carried on each PDCCH. According to this method, a control information processing delay can be reduced by performing independent channel encoding on each PDCCH.

When the n time-frequency resource positions are located in a same slot, the network device may perform joint channel encoding on the PDCCH. In other words, when the n time-frequency resource positions are located in a same slot, the network device may perform independent channel encoding on DCI carried on a plurality of PDCCHs. According to this method, when joint channel encoding is performed on the plurality of PDCCHs, a cyclic redundancy check (CRC) needs to be added only once, thereby reducing overheads, reducing an equivalent bit rate, and improving receiving performance.

In an instance of repeated transmission of the PDCCH, the network device separately sends data corresponding to the PDCCH to the terminal device at n first time-frequency resource positions corresponding to the n time-frequency resource positions through a physical downlink shared channel PDSCH.

In another instance of repeated transmission of the PDCCH, the network device sends data corresponding to the PDCCH to the terminal device at a second time-frequency resource position corresponding to the n time-frequency resource positions through a PDSCH.

The first indication information further includes configuration information for repeatedly transmitting the data corresponding to the PDCCH.

Specifically, when the network device separately sends the data corresponding to the PDCCH to the terminal device at the n first time-frequency resource positions corresponding to the n time-frequency resource positions through the physical downlink shared channel PDSCH, the configuration information is used to indicate that the data corresponding to the PDCCH is transmitted at the n first time-frequency resource positions. In other words, in this case, the configuration information is used to indicate that the data corresponding to the PDCCH is repeatedly transmitted.

In addition, when the network device sends the data corresponding to the PDCCH to the terminal device at the second time-frequency resource position corresponding to the n time-frequency resource positions through the PDSCH, the configuration information is used to indicate that the data corresponding to the PDCCH is transmitted at the second time-frequency resource position. In other words, in this case, the configuration information is used to indicate that the data corresponding to the PDCCH is not repeatedly transmitted.

The first indication information may further include format information of the downlink control information DCI carried on the PDCCH and/or a first quantity of candidate positions. The format information may be used to indicate a format of the control information carried on the PDCCH. The first quantity of candidate positions may be used to determine a candidate position for receiving the PDCCH.

In this embodiment of the present disclosure, the network device may further determine a plurality of PDCCHs at lower aggregation levels based on one PDCCH at a higher aggregation level, and perform repeated sending of the plurality of PDCCHs at the lower aggregation levels according to the foregoing PDCCH transmission method, to implement a sending effect of the PDCCH at the higher aggregation level. In this case, the PDCCH at the higher aggregation level is no longer sent. Downlink control information carried on the PDCCH at the higher aggregation level is the same as downlink control information separately carried on the plurality of PDCCHs at the lower aggregation levels. According to this method, a sending effect of sending the PDCCH at the higher aggregation level can be implemented through repeated sending of the plurality of PDCCHs at the lower aggregation levels, so that reliability of PDCCH transmission is improved, and a probability of PDCCH congestion can be reduced, because the PDCCH no longer needs to occupy consecutive CCEs with a quantity corresponding to the higher aggregation level.

According to a second aspect, the present disclosure provides a physical downlink control channel (PDCCH) transmission method. This method may be performed by a terminal device or a chip in the terminal device. According to this method, the terminal device may receive first indication information from a network device, where the first indication information may include configuration information of a PDCCH, the configuration information is used to indicate at least one repeated transmission configuration manner, and the at least one repeated transmission configuration manner includes a first repeated transmission configuration manner. The terminal device may receive, based on each repeated transmission configuration manner, the PDCCH sent by the network device, where the PDCCH is sent in the first repeated transmission configuration manner. The repeated transmission configuration manner includes at least one of a quantity of repetitions of the PDCCH and an aggregation level that is of the PDCCH and that corresponds to the quantity of repetitions.

The first repeated transmission configuration manner may include a quantity n of repetitions of the PDCCH. The terminal device may separately receive, at n time-frequency resource positions, the PDCCH sent by the network device, where n is an integer greater than or equal to 2.

The first indication information further includes search space information, where the search space information is used to determine the n time-frequency resource positions.

The n time-frequency resource positions are determined based on at least one search space and at least one control resource set associated with the at least one search space.

The terminal device may perform joint channel decoding on the PDCCH.

The terminal device may separately receive data corresponding to the PDCCH from the network device at n first time-frequency resource positions corresponding to the n time-frequency resource positions through a physical downlink shared channel PDSCH. Alternatively, the terminal device may receive data corresponding to the PDCCH from the network device at a second time-frequency resource position corresponding to the n time-frequency resource positions through a PDSCH.

The first indication information further includes configuration information for repeatedly transmitting the data corresponding to the PDCCH.

When the configuration information for repeatedly transmitting the data corresponding to the PDCCH is used to indicate that the data corresponding to the PDCCH is separately transmitted at the n first time-frequency resource positions, the terminal device may separately receive the data corresponding to the PDCCH from the network device at the n first time-frequency resource positions corresponding to the n time-frequency resource positions through the physical downlink shared channel PDSCH. When the configuration information for repeatedly transmitting the data corresponding to the PDCCH is used to indicate that the data corresponding to the PDCCH is transmitted at the second time-frequency resource position, the terminal device may receive the data corresponding to the PDCCH from the network device at the second time-frequency resource position corresponding to the n time-frequency resource positions through the PDSCH.

The first indication information further includes format information of DCI carried on the PDCCH and/or a first quantity of candidate positions.

The terminal device may determine, based on the first quantity of candidate positions, a candidate position for receiving the PDCCH, and receive the PDCCH based on the candidate position.

According to a third aspect, an embodiment of the present disclosure provides a communication apparatus. The communication apparatus may be configured to perform the steps performed by the network device in any one of the first aspect or the possible designs of the first aspect. The communication apparatus may implement functions in the foregoing method in a form of a hardware structure, a software module, or a combination of a hardware structure and a software module.

When the communication apparatus shown in the third aspect is implemented by using the software module, the communication apparatus may include a communication module and a processing module that are coupled to each other. The communication module may be configured to support the communication apparatus in performing communication. The processing module may be used by the communication apparatus to perform a processing operation, for example, generate information/a message that needs to be sent, or process a received signal to obtain information/a message.

When performing the steps in the foregoing first aspect, the communication module may be configured to send first indication information to a terminal device, where the first indication information includes configuration information of a PDCCH, the configuration information is used to indicate at least one repeated transmission configuration manner, and the at least one repeated transmission configuration manner includes a first repeated transmission configuration manner. The communication module may be further configured to send the PDCCH to the terminal device in the first repeated transmission configuration manner. The repeated transmission configuration manner includes at least one of a quantity of repetitions of the PDCCH and an aggregation level that is of the PDCCH and that corresponds to the quantity of repetitions.

The first repeated transmission configuration manner includes a quantity n of repetitions of the PDCCH. The communication module may separately send the PDCCH at n time-frequency resource positions, where n is an integer greater than or equal to 2.

The first indication information further includes search space information, where the search space information is used to determine the n time-frequency resource positions.

The n time-frequency resource positions are determined based on at least one search space and at least one control resource set associated with the at least one search space.

When the n time-frequency resource positions are located in different slots, the communication module may perform independent channel encoding on each PDCCH.

When the n time-frequency resource positions are located in a same slot, the communication module may perform joint channel encoding on the PDCCH.

The communication module may further separately send data corresponding to the PDCCH to the terminal device at n first time-frequency resource positions corresponding to the n time-frequency resource positions through a physical downlink shared channel PDSCH. Alternatively, the communication module may send data corresponding to the PDCCH to the terminal device at a second time-frequency resource position corresponding to the n time-frequency resource positions through a PDSCH.

The first indication information further includes configuration information for repeatedly transmitting the data corresponding to the PDCCH. When the communication module separately sends the data corresponding to the PDCCH to the terminal device at the n first time-frequency resource positions corresponding to the n time-frequency resource positions through the physical downlink shared channel PDSCH, the configuration information may be used to indicate that the data corresponding to the PDCCH is transmitted at the n first time-frequency resource positions. Alternatively, when the communication module sends the data corresponding to the PDCCH to the terminal device at the second time-frequency resource position corresponding to the n time-frequency resource positions through the PDSCH, the configuration information may be used to indicate that the data corresponding to the PDCCH is transmitted at the second time-frequency resource position.

The first indication information further includes format information of DCI carried on the PDCCH and/or a first quantity of candidate positions.

When the communication apparatus shown in the third aspect is implemented by using a hardware component, the communication apparatus may include a memory and a processor. The memory may be configured to store instructions (or referred to as a computer program or a program), and the processor may be configured to invoke the instructions from the memory and run the instructions, to perform the steps performed by the network device in any one of the first aspect or the possible designs of the first aspect.

The communication apparatus may further include a transceiver, used by the communication apparatus to perform communication.

Specifically, the transceiver may be configured to perform the steps performed by the communication module in the third aspect, and/or the processor may be configured to perform the steps performed by the processing module in the third aspect.

According to a fourth aspect, an embodiment of the present disclosure provides a communication apparatus. The communication apparatus may be configured to perform the steps performed by the terminal device in any one of the second aspect or the possible designs of the second aspect. The communication apparatus may implement functions in the foregoing method in a form of a hardware structure, a software module, or a combination of a hardware structure and a software module.

When the communication apparatus shown in the fourth aspect is implemented by using the software module, the communication apparatus may include a communication module and a processing module that are coupled to each other. The communication module may be configured to support the communication apparatus in performing communication. The processing module may be used by the communication apparatus to perform a processing operation, for example, generate information/a message that needs to be sent, or process a received signal to obtain information/a message.

When performing the steps in the foregoing second aspect, the communication module may be configured to receive first indication information from a network device, where the first indication information includes configuration information of a PDCCH, the configuration information is used to indicate at least one repeated transmission configuration manner, and the at least one repeated transmission configuration manner includes a first repeated transmission configuration manner. The communication module may be further configured to receive, in each repeated transmission configuration manner, the PDCCH sent by the network device, where the PDCCH is sent in the first repeated transmission configuration manner. Each repeated transmission configuration manner includes at least one of a quantity of repetitions of the PDCCH and an aggregation level that is of the PDCCH and that corresponds to the quantity of repetitions.

The first repeated transmission configuration manner includes a quantity n of repetitions of the PDCCH. The communication module may separately receive, at n time-frequency resource positions, the PDCCH sent by the network device, where n is an integer greater than or equal to 2.

The first indication information further includes search space information, where the search space information is used to determine the n time-frequency resource positions.

The n time-frequency resource positions are determined based on at least one search space and at least one control resource set associated with the at least one search space.

The communication module may perform joint channel decoding on the PDCCH.

The communication module may further separately receive data corresponding to the PDCCH from the network device at n first time-frequency resource positions corresponding to the n time-frequency resource positions through a physical downlink shared channel PDSCH. Alternatively, the communication module may further receive data corresponding to the PDCCH from the network device at a second time-frequency resource position corresponding to the n time-frequency resource positions through a PDSCH.

The first indication information further includes configuration information for repeatedly transmitting the data corresponding to the PDCCH.

When the configuration information is used to indicate that the data corresponding to the PDCCH is separately transmitted at the n first time-frequency resource positions, the communication module may separately receive the data corresponding to the PDCCH from the network device at the n first time-frequency resource positions corresponding to the n time-frequency resource positions through the physical downlink shared channel PDSCH. When the configuration information is used to indicate that the data corresponding to the PDCCH is transmitted at the second time-frequency resource position, the communication module may receive the data corresponding to the PDCCH from the network device at the second time-frequency resource position corresponding to the n time-frequency resource positions through the PDSCH.

The first indication information further includes format information of DCI carried on the PDCCH and/or a first quantity of candidate positions.

The communication apparatus may further include the processing module, where the processing module may determine, based on the first quantity of candidate positions, a candidate position for receiving the PDCCH. The communication module may receive the PDCCH based on the candidate position.

When the communication apparatus shown in the fourth aspect is implemented by using a hardware component, the communication apparatus may include a memory and a processor. The memory may be configured to store instructions (or referred to as a computer program or a program), and the processor may be configured to invoke the instructions from the memory and run the instructions, to perform the steps performed by the terminal device in any one of the second aspect or the possible designs of the second aspect.

The communication apparatus may further include a transceiver, used by the communication apparatus to perform communication.

Specifically, the transceiver may be configured to perform the steps performed by the communication module in the fourth aspect, and/or the processor may be configured to perform the steps performed by the processing module in the fourth aspect.

According to a fifth aspect, the present disclosure provides a communication system. The communication system may include the communication apparatus shown in the third aspect and the communication apparatus shown in the fourth aspect. The communication apparatus shown in the third aspect may include a software module and/or a hardware component. The communication apparatus shown in the fourth aspect may include a software module and/or a hardware component.

That the communication apparatus shown in the third aspect is a network device and the communication apparatus shown in the fourth aspect is a terminal device is used as an example. In the communication system provided in this embodiment of the present disclosure, the network device may send first indication information to the terminal device, where the first indication information may include configuration information of a PDCCH, the configuration information is used to indicate at least one repeated transmission configuration manner, and the at least one repeated transmission configuration manner includes a first repeated transmission configuration manner. Correspondingly, the terminal device may receive the first indication information. The network device may further send the PDCCH to the terminal device based on the first repeated transmission configuration manner. Correspondingly, the terminal device may receive, based on each repeated transmission configuration manner, the PDCCH sent by the network device. The repeated transmission configuration manner may include at least one of a quantity of repetitions of the PDCCH and an aggregation level that is of the PDCCH and that corresponds to the quantity of repetitions.

According to a sixth aspect, the present disclosure provides a computer-readable storage medium. The computer-readable storage medium stores instructions (or referred to as a computer program or a program). When the instructions are invoked and executed on a computer, the computer is enabled to perform the method according to any one of the first aspect or the possible designs of the first aspect or the method according to any one of the second aspect or the possible designs of the second aspect.

According to a seventh aspect, the present disclosure provides a computer program product. The computer program product may include instructions (or referred to as a computer program or a program). When the computer program product runs on a computer, the computer is enabled to perform the method according to any one of the first aspect or the possible designs of the first aspect or the method according to any one of the second aspect or the possible designs of the second aspect.

According to an eighth aspect, the present disclosure provides a chip and/or a chip system including the chip. The chip may include a processor. The chip may further include a memory (or a storage module) and/or a transceiver (or a communication module). The chip may be configured to read and execute instructions stored in the memory, to perform the method according to any one of the first aspect or the possible designs of the first aspect or the method according to any one of the second aspect or the possible designs of the second aspect. The chip system may include the chip, or may include the chip and another discrete component, for example, a memory (or a storage module) and/or a transceiver (or a communication module).

For beneficial effects of the second aspect to the eighth aspect and the possible designs of the second aspect to the eighth aspect, refer to descriptions of the beneficial effects of the method according to any one of the first aspect and the possible designs of the first aspect.

DESCRIPTION OF EMBODIMENTS

Figure 1:
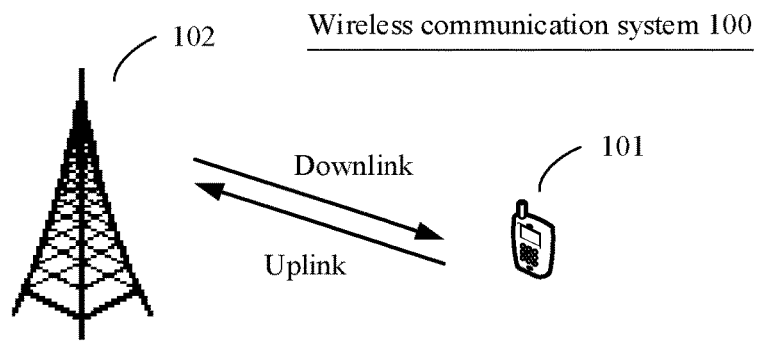
FIG. 1 is a schematic diagram of an architecture of a wireless communication system according to an embodiment of the present disclosure.

As shown in FIG. 1, a PDCCH transmission method provided in embodiments of the present disclosure may be applied to a wireless communication system 100, where the wireless communication system may include a terminal device 101 and a network device 102. The terminal device 101 is configured to support carrier aggregation, and the terminal device 101 may be connected to a plurality of component carriers of the network device 102, where the plurality of component carriers include one primary component carrier and one or more secondary component carriers.

It should be understood that the foregoing wireless communication system 100 is applicable to both a low frequency scenario (sub 6G) and a high frequency scenario (above 6G). An application scenario of the wireless communication system 100 includes but is not limited to a long term evolution (LTE) system, an LTE frequency division duplex (FDD) system, an LTE time division duplex (TDD) system, a worldwide interoperability for microwave access (WiMAX) communication system, a cloud radio access network (CRAN) system, a future 5th generation (5G) system, a new radio (NR) communication system, a future evolved public land mobile network (PLMN) system, or the like.

The terminal device 101 shown above may be user equipment (UE), a terminal (terminal), an access terminal, a terminal unit, a terminal station, a mobile station (mobile station, MS), a remote station, a remote terminal, a mobile terminal, a wireless communication device, a terminal agent, a terminal device, or the like. The terminal device 101 may have a wireless transceiver function. The terminal device 101 can perform communication (for example, wireless communication) with one or more network devices in one or more communication systems, and accepts a network service provided by the network device. The network device herein includes but is not limited to the network device 102 shown in the figure.

The terminal device 101 may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, a terminal device in a future 5G network, a terminal device in a future evolved PLMN network, or the like.

In addition, the terminal device 101 may be deployed on land, where the deployment includes indoor or outdoor, or handheld or vehicle-mounted deployment, the terminal device 101 may be deployed on water (for example, on a ship), or the terminal device 101 may be deployed in air (for example, on an aircraft, a balloon, or a satellite). The terminal device 101 may be specifically a mobile phone, a tablet computer (pad), a computer that has a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. Alternatively, the terminal device 101 may be a communication chip having a communication module.

The network device 102 may be an access network device (or referred to as an access network site). The access network device is a device that provides a network access function, for example, a radio access network (RAN) base station. The network device 102 may specifically include a base station (BS), or include a base station, a radio resource management device configured to control the base station, and the like. The network device 102 may further include a relay station (relay device), an access point, a base station in a future 5G network, a base station in a future evolved PLMN network, an NR base station, or the like. The network device 102 may be a wearable device or a vehicle-mounted device. Alternatively, the network device 102 may be a communication chip having a communication module.

For example, the network device 102 includes but is not limited to a next-generation base station (gNodeB, gNB) in 5G, an evolved NodeB (eNB) in an LTE system, a radio network controller (RNC), a NodeB (NB) in a WCDMA system, a radio controller in a CRAN system, a base station controller (BSC), a base transceiver station (BTS) in a GSM system or a CDMA system, a home base station (for example, a home evolved NodeB, or a home NodeB, HNB), a baseband unit (BBU), a transmission point (TRP), a transmitting point (TP), a mobile switching center, or the like.

NR is used as an example. A processing principle of the terminal device 101 for a PDCCH is that the terminal device 101 performs, in one or more search spaces (SSs), blind detection on a PDCCH sent by the network device 102, to receive downlink control information (DCI) carried on the PDCCH (where for ease of description in the present disclosure, the downlink control information may also be referred to as control information). The SS is a set of candidate positions at which the terminal device 101 needs to perform blind detection on the PDCCH, and SSs include a common search space (CSS) and a UE specific search space (USS). In addition, a concept of a control resource set (CORESET) is introduced for the PDCCH in NR. One CORESET is a candidate time-frequency resource for the terminal device 101 to attempt to detect a PDCCH by using one or more SSs. The CORESET may include $N_{RB}^{CORESET}$ consecutive resource blocks in frequency domain and $N_{symb}^{CORESET} \in \{1,2,3\}$ consecutive symbols in time domain. A time-frequency position of the CORESET may be any position of a BWP and any position of a slot. A time domain position and a frequency domain position of the CORESET may be semi-statically configured by a side of the network device 102 by using higher layer signaling.

Figure 2:
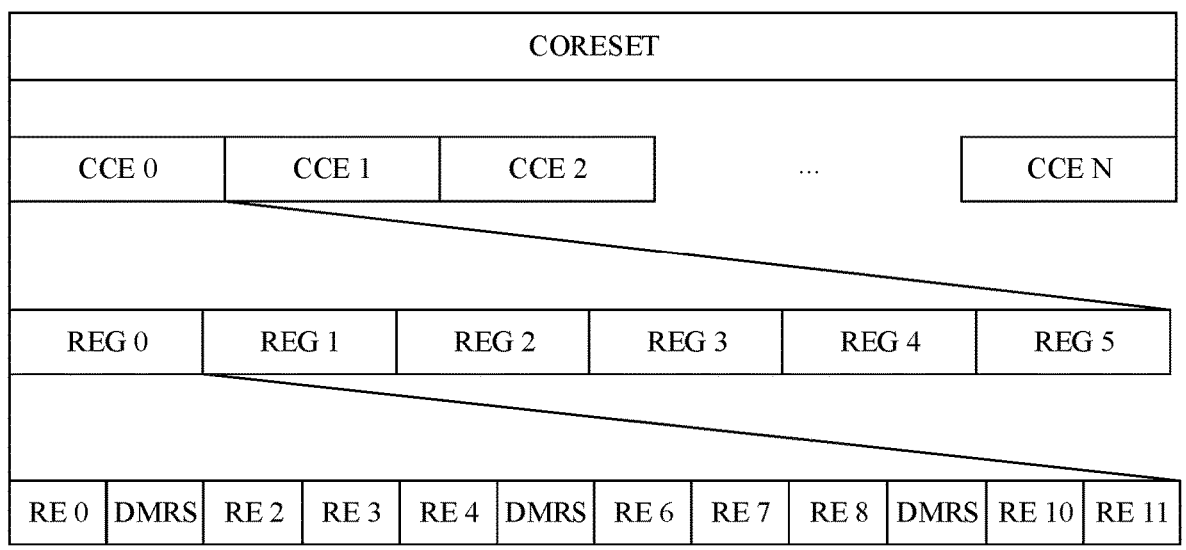
FIG. 2 is a schematic diagram of a structure of a CCE according to an embodiment of the present disclosure.

A resource used by one PDCCH is formed through aggregation of one or more CCEs in one CORESET, and a quantity of the one or more CCEs corresponds to an AL of the PDCCH. Currently, a correspondence between an aggregation level that is of a PDCCH and that is supported in NR and a quantity of CCEs used by the PDCCH is shown in Table 1. As shown in FIG. 2, one CCE may include six resource element groups (REGs), and each REG includes one symbol in time domain and one resource block (RB) in frequency domain. One RB may include 12 resource elements (REs) in frequency domain.

TABLE 1

| Aggregation level of a PDCCH | Quantity of CCEs used by the PDCCH |
|---|---|
| 1 | 1 |
| 2 | 2 |
| 4 | 4 |
| 8 | 8 |
| 16 | 16 |

When performing blind detection on a PDCCH sent by the network device 102, the terminal device 101 needs to perform, based on each possible aggregation level of the PDCCH, detection at each PDCCH candidate position configured by the network device 102. Therefore, when an aggregation level of the PDCCH is unknown, the terminal device 101 performs blind detection at each candidate position for a plurality of times.

Repeatedly sending a PDCCH (or referred to as repeatedly transmitting a PDCCH) means separately transmitting same DCI through a plurality of different PDCCHs. In the present disclosure, repeatedly sending a PDCCH may also be referred to as repeatedly sending DCI.

Figure 3:
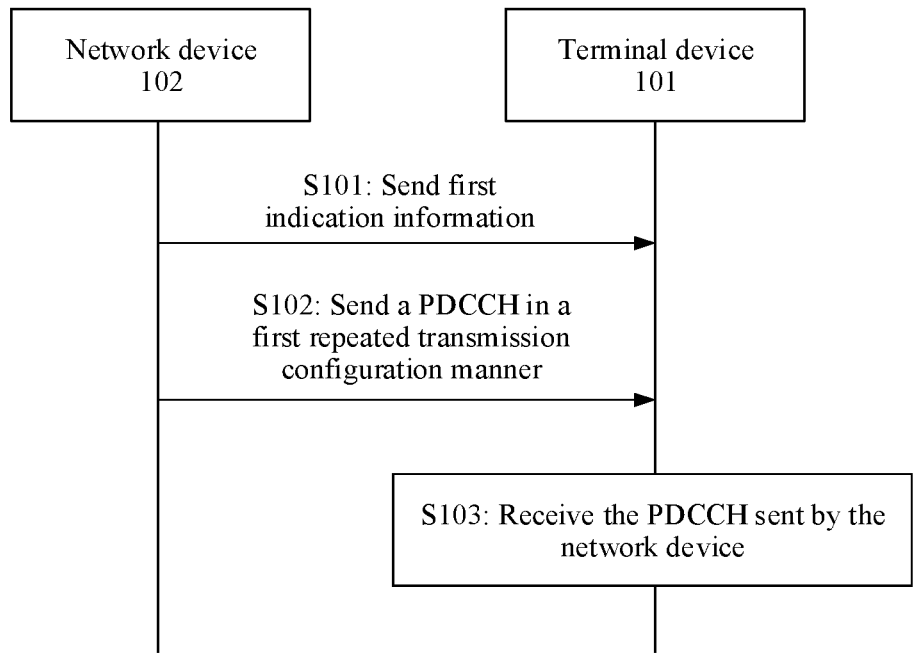
FIG. 3 is a schematic flowchart of a PDCCH transmission method according to an embodiment of the present disclosure.

As shown in FIG. 3, the PDCCH transmission method provided in the embodiments of the present disclosure may include the following steps:

S101: The network device 102 sends first indication information to the terminal device 101, where the first indication information includes configuration information of a PDCCH, the configuration information is used to indicate at least one repeated transmission configuration manner, and the at least one repeated transmission configuration manner includes a first repeated transmission configuration manner.

Correspondingly, the terminal device 101 receives the first indication information from the network device 102.

S102: The network device 102 sends the PDCCH to the terminal device 101 in the first repeated transmission configuration manner. The repeated transmission configuration manner includes at least one of a quantity of repetitions of the PDCCH and an aggregation level that is of the PDCCH and that corresponds to the quantity of repetitions.

S103: The terminal device 101 receives the PDCCH sent by the network device 102.

According to the foregoing method, the network device may schedule the terminal by using a plurality of repeatedly sent PDCCHs, and the terminal performs combined receiving on the repeatedly sent PDCCHs, so that detection performance of the PDCCH is enhanced. In this way, a sending effect of a PDCCH at a higher aggregation level can be implemented through repeated sending of a plurality of PDCCHs at lower aggregation levels. Because each PDCCH at the lower aggregation level occupies less consecutive CCEs than the PDCCH at the higher aggregation level, a quantity of consecutive CCEs occupied when a PDCCH is sent can be reduced, a problem that excessive consecutive time-frequency resources are occupied when the terminal is scheduled by using the PDCCH at the higher aggregation level is avoided, and a solution for scheduling the terminal by using the PDCCH at the higher aggregation level is optimized.

For example, the first indication information may carry a correspondence, shown in Table 2, between a quantity of repetitions of the PDCCH and an aggregation level of the repeatedly sent PDCCH. Each correspondence may indicate one repeated transmission configuration manner, and each repeated transmission configuration manner may also be referred to as a repeated transmission pattern in the present disclosure. Alternatively, the first indication information may carry only content in the column of "aggregation level of the repeatedly sent PDCCH" in Table 2, or carry only content in the column of "quantity of repetitions of the PDCCH" in Table 2.

TABLE 2

| Index | Quantity of repetitions of the PDCCH | Aggregation level of the repeatedly sent PDCCH |
|---|---|---|
| #1 | 2 | AL-8 + AL-8 |
| #2 | 3 | AL-8 + AL-4 + AL-4 |

TABLE 2-continued

| Index | Quantity of repetitions of the PDCCH | Aggregation level of the repeatedly sent PDCCH |
|---|---|---|
| #3 | 4 | AL-4 + AL-4 + AL-4 + AL-4 |
| ... | ... | ... |

According to Table 2, the network device 102 may send the PDCCH based on one of a plurality of repeated transmission configuration manners. For example, the network device repeatedly sends the PDCCH based on the repeated transmission configuration manner shown by #1, where the PDCCH is sent for two times, and aggregation levels of the repeatedly sent PDCCH are both AL-8.

When the network device 102 repeatedly sends the PDCCH, in addition to performing blind detection at each candidate position based on a possible aggregation level of the PDCCH, the terminal device 101 further needs to consider a possible quantity of repetitions of the PDCCH when performing blind detection on the PDCCH. Therefore, when both the aggregation level of the PDCCH and the quantity of repetitions of the PDCCH are unknown, complexity of performing blind detection on the PDCCH by the terminal device 101 is excessively high, and heavy load is brought to the terminal device 101. The embodiments of the present disclosure provide a PDCCH transmission method, to optimize a PDCCH repeated sending solution to reduce complexity of blind detection. The terminal device 101 may perform blind detection on the PDCCH based on each repeated transmission configuration manner shown in Table 2. The terminal device 101 does not need to perform blind detection based on a quantity of repetitions of the PDCCH and/or an aggregation level that is of the PDCCH and that corresponds to the quantity of repetitions that are/is not shown in Table 2. Therefore, complexity of performing blind detection on the repeatedly sent PDCCH by the terminal device 101 can be reduced.

For example, when the network device 102 configures information about the plurality of repeated transmission configuration manners shown by index #1 to index #3 in Table 2, when performing blind detection on a plurality of pieces of downlink control information, the terminal device 101 may perform blind detection on two PDCCHs whose aggregation levels are respectively AL-8 and AL-8 at candidate positions of the PDCCHs based on the repeated transmission configuration manner shown by #1, perform blind detection on three PDCCHs whose aggregation levels are respectively AL-8, AL-4, and AL-4 at candidate positions of the PDCCHs based on the repeated transmission configuration manner shown by #2, and perform blind detection on four PDCCHs whose aggregation levels are respectively AL-4, AL-4, AL-4, and AL-4 at candidate positions of the PDCCHs based on the repeated transmission configuration manner shown by #3. A sequence in which the terminal device 101 performs blind detection based on the plurality of repeated transmission configuration manners is not limited in the present disclosure. The terminal device 101 may perform blind detection on the plurality of PDCCHs in the repeated transmission configuration manners shown by index #1, index #2, and index #3 in a random sequence. If a plurality of PDCCHs indicated by a specific repeated transmission configuration manner can be detected based on the repeated transmission configuration manner, the terminal device 101 may no longer perform blind detection based on another repeated transmission configuration manner.

In S102, the first repeated transmission configuration manner includes a quantity n of repetitions of the PDCCH, and the network device 102 may separately send the PDCCH at n time-frequency resource positions, where n is an integer greater than or equal to 2. The n time-frequency resource positions may be separately used to transmit the PDCCH.

The n time-frequency resource positions may be determined based on at least one search space and at least one control resource set associated with the at least one search space.

For example, the n time-frequency resource positions may include n search spaces respectively associated with n control resource sets. Alternatively, for example, the n time-frequency resource positions may include n search spaces in a same control resource set. Alternatively, for another example, the n time-frequency resource positions may include n transmission occasions in a same search space. For example, the n time-frequency resource positions are distributed in n consecutive slots in the search space. In the present disclosure, the transmission occasions are time domain positions of the n time-frequency resource positions in the search space, for example, slots or symbols in the search space.

For example, when the n time-frequency resource positions include a plurality of search spaces in a same control resource set, an interval between the plurality of search spaces is not less than (or greater than) duration of the control resource set. When the n time-frequency resource positions include a plurality of transmission occasions in a same search space, duration of the search space should be not less than two slots.

Correspondingly, the terminal device 101 separately receives the PDCCH at the n time-frequency resource positions.

According to the foregoing method, the network device 102 repeatedly sends the PDCCH at the n time-frequency resource positions separately, and the terminal device 101 may separately receive the PDCCH at the n time-frequency resource positions. For example, the n time-frequency resource positions may be indicated by the network device 102, or may be defined in a protocol or preset. Therefore, complexity of performing blind detection on the repeatedly sent PDCCH by the terminal device 101 can be further reduced.

For example, when the network device 102 repeatedly sends the PDCCH at the n time-frequency resource positions separately, the first repeated transmission configuration manner may be used to indicate a quantity n of repetitions of the PDCCH.

The n time-frequency resource positions may be indicated by the network device 102 to the terminal device 101. For example, the first indication information may include search space information, where the search space information may be used to indicate the n time-frequency resource positions. Alternatively, the network device 102 may send the search space information to the terminal device 101 by using other signaling before or after sending the first indication information. The search space information may include information such as an identifier (or referred to as a number or an index) of a search space. Specifically, the search space information may include identifiers of a plurality of search spaces associated with a plurality of different control resource sets. For another example, the search space information may alternatively include identifiers of a plurality of search spaces in a same control resource set. In addition, the search space information may include an identifier (or referred to as a number or an index) of a transmission occasion in a search space, to indicate the transmission occasion in the search space. In the present disclosure, the transmission occasion of the search space may be a slot included in the search space. For example, the search space information may include a number of the search space and identifiers of a plurality of consecutive slots in the search space, to indicate the plurality of consecutive slots.

It should be understood that, when the first indication information does not carry the search space information, the terminal device 101 may determine, based on the protocol or in a pre-configuration manner, the n time-frequency resource positions at which the network device 102 sends a plurality of PDCCHs.

In S102, the network device 102 may determine a channel encoding manner for repeatedly transmitting the PDCCH (or referred to as a channel encoding manner of control information separately carried on the plurality of PDCCHs) based on the n time-frequency resource positions.

In a specific example, when the n time-frequency resource positions are located in different slots, or in other words, when the plurality of repeatedly transmitted PDCCHs are located in different slots, the network device 102 may perform independent channel encoding on each repeatedly transmitted PDCCH. In other words, in this case, the network device 102 may perform independent channel encoding on control information carried on each repeatedly transmitted PDCCH. Correspondingly, the terminal device 101 may perform independent channel decoding on each PDCCH transmitted in a plurality of slots (or referred to as control information carried on each PDCCH transmitted in the plurality of slots). According to this method, a control information processing delay can be reduced. In addition, hybrid automatic repeat request (HARQ) soft combination may be introduced for PDCCH transmission. A terminal may perform HARQ combination on data of repeatedly transmitted PDCCHs and then perform decoding, to improve PDCCH decoding performance.

In another specific example, when the n time-frequency resource positions are located in a same slot, or in other words, when the plurality of repeatedly transmitted PDCCHs are located in a same slot, the network device 102 may perform joint channel encoding on the plurality of repeatedly transmitted PDCCHs. In other words, in this case, the network device 102 may perform independent channel encoding on control information carried on each repeatedly transmitted PDCCH. Correspondingly, the terminal device 101 may perform joint channel decoding on the PDCCHs separately transmitted in the same slot (or referred to as the control information carried on the PDCCHs separately transmitted in the same slot). Joint channel encoding is to perform unified encoding on control information separately carried on a plurality of PDCCHs. An advantage of joint channel encoding is that a cyclic redundancy check (CRC) needs to be added only once for a plurality of PDCCHs on which joint channel encoding is performed, thereby reducing overheads, reducing an equivalent bit rate, and improving receiving performance.

In an example of S102, the network device 102 may separately send data corresponding to the PDCCH to the terminal device 101 at n first time-frequency resource positions corresponding to the n time-frequency resource positions through a physical downlink shared channel (PDSCH). In other words, in this example, the network device 102 repeatedly transmits the data corresponding to the PDCCH. Correspondingly, the terminal device 101 may separately receive the data corresponding to the PDCCH from the network device 102 at the n first time-frequency resource positions corresponding to the n time-frequency resource positions through the PDSCH. According to this method, the network device 102 may repeatedly transmit the data corresponding to the PDCCH to the terminal device 101.

In this example, the network device 102 may indicate, to the terminal device 101, that the data corresponding to the PDCCH is repeatedly transmitted. Specifically, the network device 102 may include, in the first indication information, configuration information for repeatedly transmitting the data corresponding to the PDCCH. The configuration information may be used to indicate that the data corresponding to the PDCCH is separately transmitted at the n first time-frequency resource positions. Alternatively, the configuration information may be used to indicate that the data corresponding to the PDCCH is repeatedly transmitted. In addition, the configuration information may alternatively be carried in another message or other signaling.

When the data corresponding to the PDCCH is repeatedly transmitted, in a possible example, the network device 102 may transmit each PDCCH and data corresponding to each PDCCH in a same slot. In another possible example, the network device 102 may transmit each PDCCH and data corresponding to each PDCCH in different slots.

In another example of S102, the network device 102 may send data corresponding to the PDCCH to the terminal device 101 at a second time-frequency resource position corresponding to the n time-frequency resource positions through a PDSCH. In other words, in this example, the network device 102 transmit the PDSCH data corresponding to the PDCCH only once. Correspondingly, the terminal device 101 may receive the data corresponding to the PDCCH from the network device 102 at the second time-frequency resource position corresponding to the n time-frequency resource positions through the PDSCH.

In this example, the network device 102 may include, in the first indication information, configuration information for repeatedly transmitting the data corresponding to the PDCCH. The configuration information may be used to indicate that the data corresponding to the PDCCH is transmitted at the second time-frequency resource position. In addition, the configuration information may alternatively be carried in another message or other signaling.

When the data corresponding to the PDCCH is not repeatedly transmitted, in a possible example, the network device may transmit the plurality of repeatedly transmitted PDCCHs in a same slot, and transmit the data corresponding to the PDCCH (or referred to as the PDSCH) in another slot (for example, a next slot of the slot in which the PDCCH is located).

It should be understood that, when the first indication information does not carry the configuration information for repeatedly transmitting the data corresponding to the PDCCH, a transmission position of the data corresponding to the PDCCH may be determined based on the protocol or in a pre-configuration manner. For example, the terminal device 101 and/or the network device 102 may consider by default that the data corresponding to the PDCCH is repeatedly transmitted, or consider by default that the data corresponding to the PDCCH is not repeatedly transmitted.

In addition, the first indication information may further include format information of the DCI carried on the PDCCH and/or a first quantity of candidate positions, which are separately described below.

The format information of the DCI carried on the PDCCH may be used to indicate a format of the control information carried on the repeatedly transmitted PDCCH. That the downlink control information is the DCI is used as an example. DCI in different formats is defined in a current wireless communication protocol, and DCI in different formats has different lengths, content, and the like, where the lengths, content, or the like of the DCI is referred to as a format. In the present disclosure, the format information of the DCI carried on the PDCCH may be used by the terminal device 101 to determine formats of DCI repeatedly sent by the network device 102, to reduce complexity of performing blind detection on the PDCCH by the terminal. That the control information is the DCI is used as an example. A format of the control information in the present disclosure includes but is not limited to the following DCI formats: format 1_1, format 1_0, format 0)_1, and format 0_0.

For example, when the format information of the DCI carried on the PDCCH indicates format 0_0, the terminal device 101 determines that the network device 102 repeatedly sends only DCI in format 0_0. Therefore, the terminal device 101 may no longer repeatedly monitor a PDCCH that carries DCI in another format. It should be understood that this does not mean that the terminal device 101 no longer needs to monitor DCI in another format. Herein, it means that the repeatedly sent DCI is limited only to DCI in several configured formats.

It should be understood that, when the first indication information does not carry the format information of the DCI carried on the PDCCH, the terminal device 101 may consider by default that control information in all formats is repeatedly sent, or the terminal device 101 may determine formats of repeatedly sent DCI based on the protocol or in a pre-configuration manner.

The first quantity of candidate positions is a quantity, configured by the network device 102 for the terminal device 101, of candidate positions of the PDCCH. The terminal device 101 determines a candidate position of the PDCCH based on the quantity of candidate positions, and performs blind detection on the PDCCH based on the candidate position of the PDCCH.

In a possible instance, the first quantity of candidate positions may correspond to an aggregation level of the PDCCH. For example, assuming that possible aggregation levels of the plurality of PDCCHs include AL-1, AL-2, AL-4, and AL-8, the terminal device 101 may perform blind detection on a PDCCH whose aggregation level is AL-1 based on a first quantity of candidate positions corresponding to AL-1, perform blind detection on a PDCCH whose aggregation level is AL-2 based on a first quantity of candidate positions corresponding to AL-2, perform blind detection on a PDCCH whose aggregation level is AL-4 based on a first quantity of candidate positions corresponding to AL-4, and perform blind detection on a PDCCH whose aggregation level is AL-8 based on a first quantity of candidate positions corresponding to AL-8.

In another example, the first quantity of candidate positions may correspond to a time-frequency resource position. For example, the terminal device 101 may separately perform, in a control resource set (or some control resource sets), in a search space (or some search spaces), or on a search occasion (or some search occasions) in a search space, blind detection on a plurality of PDCCHs at different aggregation levels by using a same first quantity of candidate positions.

In addition, the first quantity of candidate positions may correspond to the terminal device 101, that is, the terminal device 101 separately performs blind detection on a plurality of PDCCHs at different aggregation levels based on a same first quantity of candidate positions.

For example, when the network device 102 does not repeatedly send the PDCCH, for example, when the network device 102 does not send the first indication information, or before the network device 102 sends the first indication information, the terminal device 101 may perform blind detection on the PDCCH based on a second quantity of candidate positions. When the network device 102 repeatedly sends the PDCCH, for example, after the network device 102 sends the first indication information, the terminal device 101 may perform blind detection on the PDCCH based on the first quantity of candidate positions, where the first quantity of candidate positions may be lower than the second quantity of candidate positions. This reduces complexity of performing blind detection by the terminal device 101 when the PDCCH is repeatedly sent.

The second quantity of candidate positions may be configured by the network device 102 for the terminal device 101 before S101 is performed, or the second quantity of candidate positions may be determined by the terminal device 101 based on the protocol or in a pre-configuration manner.

In this example, specifically, the first indication information may be further used to indicate the candidate position corresponding to the first quantity of candidate positions:

$m_L' = \text{ceil}(m_L/4)$; and $m_L = 0, \ldots, ML_{p,SS\_X,max}^{L,slot\_u} - 1$.

$m_L'$ may indicate the candidate position corresponding to the first quantity of candidate positions, and my may indicate a candidate position corresponding to the second quantity of candidate positions. For example, my may specifically indicate an index of a symbol occupied by a candidate position configured in slot u for an aggregation level AL-L.

Based on the first indication information, when determining a value of the first quantity of candidate positions, the network device 102 may use an operation result obtained by first dividing the second quantity of candidate positions by 4 and then performing a round-up operation on the division result as the value of the first quantity of candidate positions. For example, when the second quantity of candidate positions is 1 to 4, the first quantity of candidate positions is 1; and when the second quantity of candidate positions is 5 to 8, the first quantity of candidate positions is 2.

It should be understood that, when the first indication information does not carry the first quantity of candidate positions, the terminal device 101 may determine the first quantity of candidate positions based on the protocol or in a pre-configuration manner. For example, the terminal device 101 may use an operation result obtained by first dividing the second quantity of candidate positions by 4 (or another value) and then performing a round-up operation on the division result as the value of the first quantity of candidate positions. For example, after determining that the network device 102 repeatedly sends the PDCCH, the terminal device 101 may determine the first quantity of candidate positions based on the second quantity of candidate positions that is previously configured by the network device 102, defined in the protocol, or preconfigured. In addition, it should be understood that, in some scenarios, the first quantity of candidate positions is not an actual quantity of times that the terminal device 101 performs blind detection on the PDCCH at each aggregation level. For example, when consecutive CCEs included in CORESET #1 used by the terminal device 101 for blind detection are insufficient to transmit n PDCCHs whose aggregation levels are m, the terminal device 101 may perform blind detection for no times on only the PDCCH whose aggregation level is m, where no is a positive integer, n0<n, m is an aggregation level of the PDCCH, and a value of m may be 1, 2, 4, 8, or 16. In other words, when K<n×m, the terminal device 101 performs blind detection for n0 times on the PDCCH whose aggregation level is m, where K is a maximum quantity of consecutive CCEs included in CORESET #1, and K is a positive integer and K≥n0×m.

That a bandwidth (BW) of a beam is 5 MHZ, and a subcarrier spacing (SCS) of the beam is 15 kHz is used as an example. One CORESET includes a maximum of three symbols in time domain and a maximum of 24 RBs in frequency domain. Therefore, one CORESET includes a maximum of 3×24=72 REGs and a maximum of 12 CCEs. When the terminal device 101 performs blind detection on a PDCCH at AL-8 in the CORESET, there may be only one candidate position. Therefore, the terminal device 101 may perform blind detection on the PDCCH at AL-8 only once.

It should be understood that some or all of the foregoing content carried in the first indication information in the present disclosure may alternatively be carried in one or more other pieces of information, signaling, or messages sent by the network device 102 to the terminal device 101. This is not specifically limited in the present disclosure.

The following further describes the PDCCH transmission method provided in the embodiments of the present disclosure by using examples. It should be understood that, in the following examples, that the network device 102 needs to include the at least one repeated transmission configuration manner in the first indication information sent to the terminal device 101 is not limited, but that the first indication information carries the at least one repeated transmission configuration manner is only used as an optional option.

Embodiment 1

Figure 4:
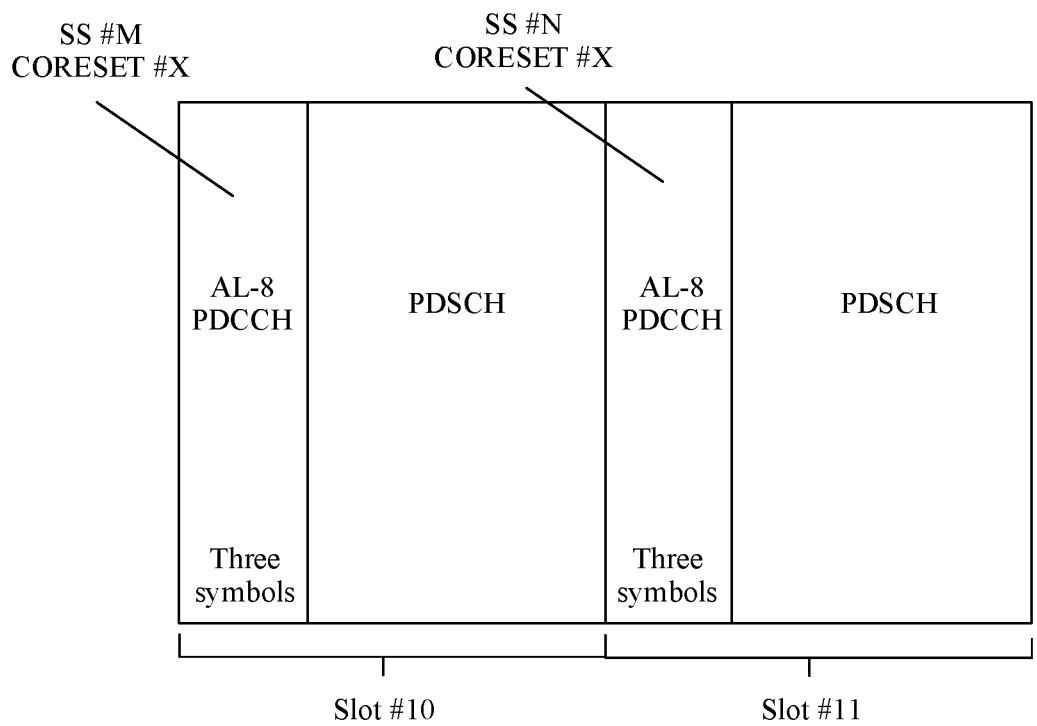
FIG. 4 is a schematic diagram of a transmission position of a PDCCH according to an embodiment of the present disclosure.

As shown in FIG. 4, that a bandwidth of a beam is 5 MHZ, and a subcarrier spacing of the beam is 15 kHz is used as an example. The network device 102 configures one CORESET for the terminal device 101 by using RRC signaling, where the CORESET is referred to as CORESET #X. CORESET #X is a time-frequency resource used by the terminal device 101 to detect a PDCCH candidate position based on SS #M and SS #N. SS #M and SS #N may be dedicated search spaces configured by the network device 102 for the terminal device 101.

CORESET #X occupies three symbols in time domain, and occupies four groups of six RBs in frequency domain. The CORESET includes 12 CCEs, and supports up to AL-8. For SS #M, the network device 102 may configure a periodicity of SS #M to be 10 slots, an offset to be 0, and a start symbol in the slot to be 0. For SS #N, the network device 102 may configure a periodicity of SS #N to be 10 slots, an offset to be 1, and a start symbol in the slot to be 0. In this example, both SS #M and SS #N occupy three symbols.

Based on S101, the network device 102 may indicate, by using first indication information, the terminal device 101 to determine that the network device 102 sends a plurality of repeated PDCCHs. For example, the first indication information may carry a predefined indication bit, to indicate that the network device 102 is to send a plurality of repeated PDCCHs. Alternatively, the first indication information may carry at least one repeated transmission configuration manner, and the terminal device 101 may determine, based on the at least one repeated transmission configuration manner, that the network device 102 sends two repeated PDCCH. The at least one repeated transmission configuration manner may be as shown in Table 2.

In addition, the network device 102 may configure search space information for the terminal device 101 by using the first indication information. The search space information may indicate that time-frequency resource positions of the plurality of repeated PDCCHs include SS #M and SS #N shown in FIG. 4.

When the PDCCH is repeatedly sent, the network device 102 may repeatedly send two PDCCHs to the terminal device 101 in slot #10 and slot #11 by using SS #M and SS #N, where an aggregation level of each PDCCH is AL-8. Slot #10 and slot #11 each includes 14 symbols. Each PDCCH may schedule a different PDSCH, and data of each PDSCH may be repeated (where in other words, each PDSCH carries same data).

Independent channel encoding is performed on the repeatedly sent PDCCH.

For a case in which the first indication information does not carry the at least one repeated transmission configuration manner, when the terminal device 101 receives the plurality of PDCCHs, because the terminal device 101 does not know an aggregation level of each PDCCH sent by the network device 102 and a quantity of repetitions of the PDCCH, the terminal device 101 may separately perform blind detection on PDCCHs at AL-1, AL-2, AL-4, and AL-8 on SS #M and SS #N.

For SS #M, it is assumed that maximum quantities of PDCCH candidate positions (that is, the foregoing second quantity of candidate positions) at AL-1, AL-2, AL-4, and AL-8 that are configured by the network device 102 when the PDCCH is not repeatedly sent are all 8. In this case, according to the method in the present disclosure, when the terminal device 101 performs blind detection on the plurality of repeatedly sent PDCCHs, maximum quantities of PDCCH candidate positions (that is, the foregoing first quantity of candidate positions) at AL-1. AL-2, AL-4, and AL-8 may all be 2. For AL-8, because CORESET #X includes only 12 CCEs and supports up to AL-8, an actual quantity of times of blind detection at AL-8 may be 1. Therefore, the terminal device 101 may separately perform, in SS #M based on each of AL-1. AL-2, and AL-4, detection on PDCCHs at two monitoring positions corresponding to each of AL-1. AL-2, and AL-4, and perform, based on AL-8, detection on a PDCCH at one monitoring position corresponding to AL-8. If the terminal device 101 successfully detects a PDCCH, the terminal device 101 may receive a PDSCH on symbol #3 to symbol #13 of slot #10 based on PDCCH information. Otherwise, if no PDCCH is successfully detected, the terminal device 101 stores monitoring data of each monitoring position of SS #M. For example, the terminal device 101 separately stores monitoring data of a monitoring position for monitoring a PDCCH at AL-1 in SS #M of slot #10, monitoring data of a monitoring position for monitoring a PDCCH at AL-2 in SS #M of slot #10, monitoring data of a monitoring position for monitoring a PDCCH at AL-4 in SS #M of slot #10, and monitoring data of a monitoring position for monitoring a PDCCH at AL-8 in SS #M of slot #10. Then, the terminal device 101 may continue to perform monitoring in slot #11, and perform detection on a PDCCH in SS #N of slot #11.

For SS #N, for a manner in which the terminal device 101 performs blind detection on a PDCCH, refer to the foregoing descriptions of performing blind detection on the PDCCH in SS #M by the terminal device 101. When the terminal device 101 detects the PDCCH in SS #N, the terminal device 101 may receive a PDSCH on symbol #3 to symbol #13 of slot #11 based on PDCCH information. Otherwise, if the terminal device 101 does not successfully detect a PDCCH, the terminal device 101 may combine data monitored at each monitoring position with monitoring data of the terminal device 101 at each monitoring position of SS #M, and perform channel decoding based on the combined data.

For a case in which the first indication information carries the at least one repeated transmission configuration manner, the terminal device 101 may perform joint channel decoding on the combined data based on each repeated transmission configuration manner.

Because the network device 102 in this embodiment only configures SS #M and SS #N, and a quantity of retransmitted PDCCHs is two, only the combination of "AL-8+AL+8" shown by index #1 can be implemented among the plurality of repeated transmission configuration manners shown by index #1 to index #3 (where in other words, both aggregation levels of the two repeatedly sent PDCCHs are AL-8). Therefore, a quantity of times of blind detection that needs to be performed after combination is 1×1=1. Specifically, the terminal device 101 may combine the monitoring data of the monitoring position for monitoring the PDCCH at AL-8 in SS #M of slot #10 with monitoring data of a monitoring position for monitoring a PDCCH at AL-8 in SS #N of slot #11, and perform blind detection based on the combined data (where the method may be referred to as combined decoding).

When blind detection is performed based on the combined data herein, the terminal device 101 may perform PDCCH combined decoding based on a CCE resource on which a detected DMRS is located. Specifically, the terminal device 101 may use a CCE resource occupied by a DMRS in the monitoring data of SS #M and/or a CCE resource occupied by a DMRS in the monitoring data of SS #N as a frequency domain position of the repeatedly sent PDCCH. In this way, a quantity of PDCCH candidate positions during combined decoding is further reduced, and detection complexity of the terminal in a PDCCH repetition process is reduced.

Embodiment 2

Figure 5:
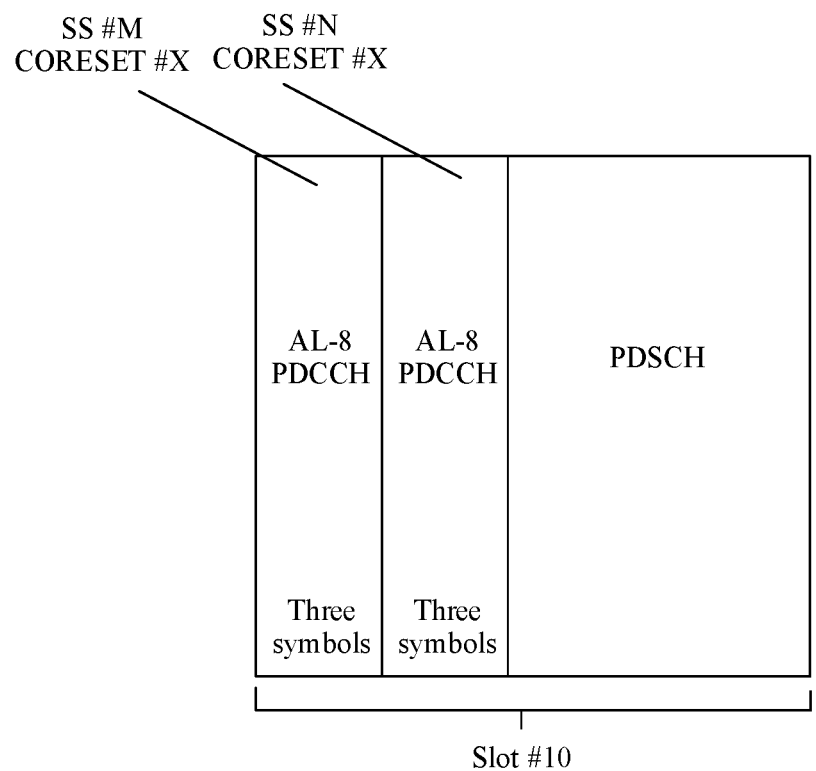
FIG. 5 is a schematic diagram of another transmission position of a PDCCH according to an embodiment of the present disclosure.

As shown in FIG. 5, that a bandwidth of a beam is 5 MHZ, and a subcarrier spacing of the beam is 15 kHz is still used as an example. The network device 102 configures CORESET #X and CORESET #Y for the terminal device 101 by using RRC signaling. CORESET #X is a time-frequency resource used by the terminal device 101 to detect a PDCCH candidate position based on SS #M, and CORESET #Y is a time-frequency resource used by the terminal device 101 to detect a PDCCH candidate position based on SS #N. SS #M and SS #N may be dedicated search spaces configured by the network device 102 for the terminal device 101.

Both CORESET #X and CORESET #Y occupy two symbols in time domain, and occupy four groups of six RBs in frequency domain. Therefore, CORESET #X and CORESET #Y each include eight CCEs, and support up to AL-8. For SS #M, the network device 102 may configure a periodicity of SS #M to be 10 slots, an offset to be 0), and a start symbol in the slot to be 0. For SS #N, the network device 102 may configure a periodicity of SS #N to be 10 slots, an offset to be 0), and a start symbol in the slot to be 2. In this example, both SS #M and SS #N occupy two symbols.

Based on S101, the network device 102 may indicate, by using first indication information, the terminal device 101 to determine that the network device 102 repeatedly sends a plurality of PDCCHs. For example, the first indication information may carry a predefined indication bit, to indicate that the network device 102 is to send a plurality of repeated PDCCHs. Alternatively, the first indication information may carry at least one repeated transmission configuration manner, and the terminal device 101 may determine, based on the at least one repeated transmission configuration manner, that the network device 102 repeatedly sends the PDCCH. The at least one repeated transmission configuration manner may be as shown in Table 2.

In addition, the network device 102 may configure search space information for the terminal device 101 by using the first indication information. The search space information may indicate that time-frequency resource positions of the plurality of repeated PDCCHs include SS #M and SS #N shown in FIG. 5.

When the PDCCH is repeatedly sent, the network device 102 may repeatedly send two PDCCHs to the terminal device 101 in slot #10 by using SS #M and SS #N, where an aggregation level of each PDCCH is AL-8. Slot #10 includes 14 symbols. The two repeated PDCCHs may schedule a same PDSCH (where in other words, the two repeated PDCCHs indicate transmission of a same PDSCH). The PDSCH may be located on symbol #4 to symbol #13 in slot #10.

When repeatedly send the PDCCH, the network device 102 may perform independent channel encoding on control information separately carried on the two repeated PDCCHs. Correspondingly, the terminal device 101 may perform independent channel decoding on the control information separately carried on the two repeated PDCCHs.

If independent channel encoding is used, for a manner in which the terminal device 101 performs blind detection on the plurality of repeatedly sent PDCCHs, refer to Embodiment 1.

For a case in which the first indication information does not carry the at least one repeated transmission configuration manner, when receiving the repeatedly transmitted PDCCHs, the terminal device 101 may perform blind detection on PDCCHs whose aggregation levels are AL-1, AL-2, AL-4, and AL-8 in SS #M of CORESET #X shown in FIG. 5. If a PDCCH is successfully detected, the terminal device 101 may receive a PDSCH based on control information carried on the PDCCH. If no PDCCH is detected, the terminal device 101 stores monitoring data of each monitoring position of SS #M.

Then, the terminal device 101 may perform blind detection on the PDCCHs whose aggregation levels are AL-1, AL-2, AL-4, and AL-8 on SS #N of CORESET #Y. If a PDCCH is successfully detected, control information carried on the PDCCH is compared with the control information detected by the terminal device 101 in SS #M. If the two pieces of control information are the same, it indicates that the two pieces of control information indicate transmission of a same PDSCH. Further, data of the PDSCH may be received.

If the terminal device 101 does not successfully detect a PDCCH in SS #N of CORESET #Y, the terminal device 101 may perform, based on the repeated transmission configuration manner configured by the network device 102, combined decoding on data of a PDCCH monitoring position that is received in SS #N and the stored data of the PDCCH monitoring position that is received in SS #M. If a PDCCH is successfully detected, a PDSCH is received based on DCI information. Herein, for a manner in which the terminal device 101 performs combined decoding, refer to descriptions of the part in Embodiment 1.

In addition, the network device 102 may perform joint channel encoding on the control information separately carried on the two repeated PDCCHs. Correspondingly, the terminal device 101 may perform joint channel decoding on the control information separately carried on the two repeated PDCCHs.

In this example, the terminal device 101 needs to continuously perform monitoring in SS #M and SS #N, and perform blind detection on PDCCHs whose aggregation levels are AL-1. AL-2. AL-4, and AL-8 in SS #M and SS #N. If no PDCCH is detected in both SS #M and SS #N, the terminal device 101 may perform, based on the repeated transmission configuration manner configured by the network device 102, combined decoding on data of a PDCCH monitoring position that is received in SS #M and data of a PDCCH monitoring position that is received in SS #N. If a PDCCH is successfully detected, a PDSCH is received based on DCI information.

In this embodiment, because the network device 102 in this embodiment only configures SS #M and SS #N, and a quantity of retransmitted PDCCHs is two, only the combination of "AL-8+AL+8" shown by index #1 can be implemented among the plurality of repeated transmission configuration manners shown by index #1 to index #3 in Table 2. Therefore, when the terminal device 101 performs combined decoding, only a case in which SS #M and SS #N each carries one PDCCH whose aggregation level is AL-8 needs to be considered. In addition, because CORESET #X and CORESET #Y each have only eight CCEs, SS #M and SS #N each have only one detection position of an AL-8 PDCCH. Therefore, a quantity of times of blind detection is only 1×1=1. If decoding succeeds, a PDSCH is received based on control information carried on the PDCCH.

In the foregoing Embodiment 1 and Embodiment 2, because the bandwidth and the subcarrier spacing of the beam determine that one control resource set includes a maximum of 12 CCEs, a PDCCH at AL-16 cannot be sent. In this case, the network device 102 may repeatedly send two PDCCHs at AL-8 for scheduling, to implement an effect of scheduling by using the PDCCH at AL-16. Therefore, a scenario in which the PDCCH at AL-16 can be implemented is expanded.

In some embodiments of the present disclosure, when sending a PDCCH at a higher AL to the terminal device 101, the network device 102 may split the PDCCH at the higher AL into a plurality of PDCCHs at lower ALs for transmission, to reduce a probability of PDCCH candidate position congestion. For example, only eight CCEs are available in a specific slot, and three terminal devices currently need to transmit PDCCHs, where the first terminal device needs to use AL-8, and the second terminal device and the third terminal device need to use AL-2. If a PDCCH resource is preferentially allocated to the first terminal device, and the first terminal device occupies all the eight CCEs, PDCCH resources cannot be allocated to the remaining two terminal devices. For the first terminal device, if an AL-8 PDCCH is split into two AL-4 PDCCHs for transmission, the first terminal device needs to occupy only four CCEs this time, and two CCEs may be allocated to each of the second and the third terminal devices. Therefore, in the slot, all the three terminal devices can perform transmission through PDCCH scheduling.

When the PDCCH at the higher AL is split into the plurality of PDCCHs at the lower ALs, a sum of the plurality of lower ALs is equal to the higher AL. The network device 102 may determine the plurality of split lower ALs based on the at least one repeated transmission configuration manner. For example, the at least one repeated transmission configuration manner includes the repeated transmission configuration manners shown by index #1 to index #3 in Table 2.

When an aggregation level of a PDCCH that needs to be transmitted is AL-16, the network device 102 may split the PDCCH at the higher AL into the plurality of PDCCHs at the lower ALs based on any repeated transmission configuration manner shown by index #1 to index #3 in Table 2. Index #3 is used as an example. The network device 102 may split the PDCCH at AL-16 into four PDCCHs at AL-4, and send the four repeated PDCCHs at AL-4. In this example, the repeated transmission configuration manner shown by index #3 is the first repeated transmission configuration manner used when the network device 102 sends the plurality of PDCCHs.

Based on a same concept as the foregoing method embodiments, an embodiment of the present disclosure further provides a communication apparatus. The communication apparatus may have a function of the network device 102 or the terminal device 101 in the foregoing method embodiments, and may be configured to perform the steps performed by the network device 102 or the terminal device 101 provided in the foregoing method embodiments. The function may be implemented by hardware, or may be implemented by software or hardware executing corresponding software. The hardware or software includes one or more modules corresponding to the foregoing function.

Figure 6:
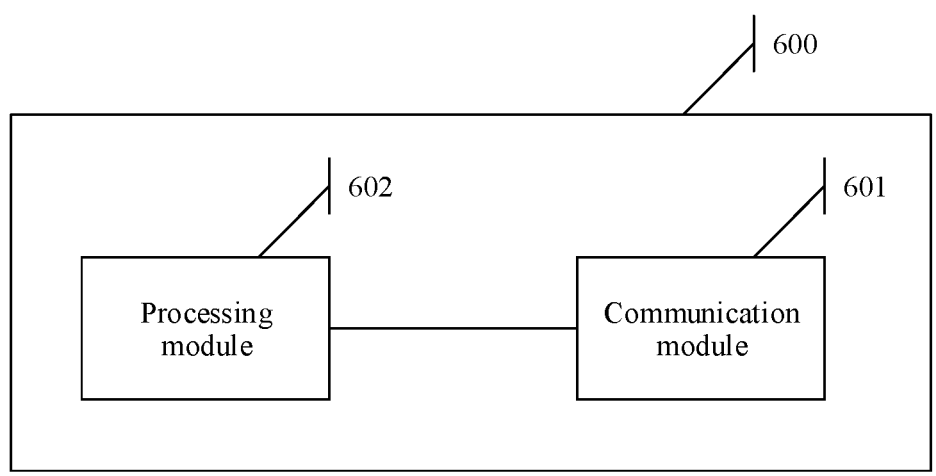
FIG. 6 is a schematic diagram of a structure of a communication apparatus according to an embodiment of the present disclosure.

In a possible implementation, the communication apparatus 600 shown in FIG. 6 may be used as the network device in the foregoing method embodiments, and perform the steps performed by the network device (for example, the network device 102) in the foregoing method embodiments. As shown in FIG. 6, the communication apparatus 600 may include a communication module 601 and a processing module 602. The communication module 601 and the processing module 602 are coupled to each other. The communication module 601 may be configured to support the communication apparatus 600 in performing communication. The communication module 601 may have a wireless communication function, for example, can perform wireless communication with another communication apparatus through a wireless air interface. The processing module 602 may be configured to support the communication apparatus 600 in performing a processing action in the foregoing method embodiments, including but not limited to: generating information and a message that are sent by the communication module 601, and/or demodulating and decoding a signal received by the communication module 601.

When performing the steps implemented by the network device, the communication module 601 may be configured to send first indication information to a terminal device, where the first indication information includes configuration information of a PDCCH, the configuration information is used to indicate at least one repeated transmission configuration manner, and the at least one repeated transmission configuration manner includes a first repeated transmission configuration manner. The communication module 601 may be further configured to send the PDCCH to the terminal device in the first repeated transmission configuration manner. The repeated transmission configuration manner includes at least one of a quantity of repetitions of the PDCCH and an aggregation level that is of the PDCCH and that corresponds to the quantity of repetitions.

The first repeated transmission configuration manner includes a quantity n of repetitions of the PDCCH. The communication module 601 may separately send the PDCCH at n time-frequency resource positions, where n is an integer greater than or equal to 2.

The first indication information further includes search space information, where the search space information is used to determine the n time-frequency resource positions.

The n time-frequency resource positions are determined based on at least one search space and at least one control resource set associated with the at least one search space.

When the n time-frequency resource positions are located in different slots, the communication module 601 may perform independent channel encoding on each PDCCH.

When the n time-frequency resource positions are located in a same slot, the communication module 601 may perform joint channel encoding on the PDCCH.

The communication module 601 may further separately send data corresponding to the PDCCH to the terminal device at n first time-frequency resource positions corresponding to the n time-frequency resource positions through a physical downlink shared channel PDSCH. Alternatively, the communication module 601 may send data corresponding to the PDCCH to the terminal device at a second time-frequency resource position corresponding to the n time-frequency resource positions through a PDSCH.

The first indication information further includes configuration information for repeatedly transmitting the data corresponding to the PDCCH. When the communication module 601 separately sends the data corresponding to the PDCCH to the terminal device at the n first time-frequency resource positions corresponding to the n time-frequency resource positions through the physical downlink shared channel PDSCH, the configuration information may be used to indicate that the data corresponding to the PDCCH is transmitted at the n first time-frequency resource positions. Alternatively, when the communication module 601 sends the data corresponding to the PDCCH to the terminal device at the second time-frequency resource position corresponding to the n time-frequency resource positions through the PDSCH, the configuration information may be used to indicate that the data corresponding to the PDCCH is transmitted at the second time-frequency resource position.

The first indication information further includes format information of DCI carried on the PDCCH and/or a first quantity of candidate positions.

In addition, the processing module 602 may determine a plurality of PDCCHs at lower aggregation levels based on a PDCCH at a higher aggregation level, where a sum of respective aggregation levels of the plurality of PDCCHs at the lower aggregation levels is equal to the higher aggregation level. The communication module 601 may be further configured to repeatedly send the plurality of PDCCHs at the lower aggregation levels. For a manner in which the communication module 601 repeatedly sends the plurality of PDCCHs at the lower aggregation levels, refer to the PDCCH transmission method provided in the embodiments of the present disclosure. For example, the communication module 601 may send the plurality of PDCCHs at the lower aggregation levels to the terminal device based on the first repeated transmission configuration manner in the at least one repeated transmission configuration manner, where the first repeated transmission configuration manner includes a quantity of the plurality of PDCCHs at the lower aggregation levels and the plurality of lower aggregation levels.

In another possible implementation, the communication apparatus provided in this embodiment of the present disclosure may alternatively include a hardware component, for example, a processor, a memory, or a transceiver.

Figure 7:
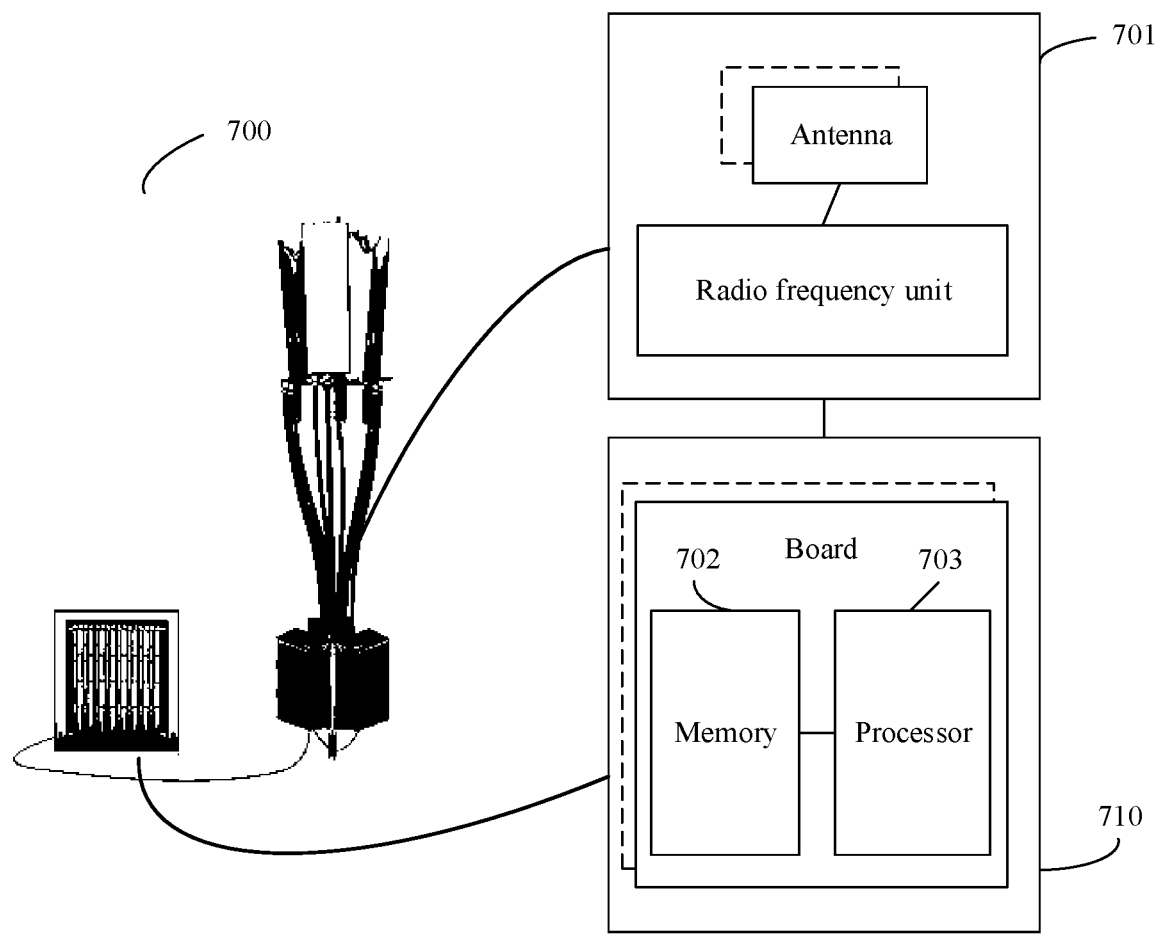
FIG. 7 is a schematic diagram of a structure of another communication apparatus according to an embodiment of the present disclosure.

For ease of understanding, in FIG. 7, a base station is used as an example to describe a structure of the communication apparatus. As shown in FIG. 7, the communication apparatus 700 may include a transceiver 701, a memory 702, and a processor 703. The transceiver 701 may be used by the communication apparatus to perform communication, for example, configured to send or receive the first information. The memory 702 is coupled to the processor 703, and may be configured to store a program and data that are necessary for implementing functions of the communication apparatus 700. The processor 703 is configured to support the communication apparatus 700 in performing a corresponding function in the foregoing method, where the function may be implemented by invoking the program stored in the memory 702.

Specifically, the transceiver 701 may be a wireless transceiver, and may be configured to support the communication apparatus 700 in receiving and sending signaling and/or data through a wireless air interface. The transceiver 701 may also be referred to as a transceiver unit or a communication unit. The transceiver 701 may include a radio frequency unit and one or more antennas, where the radio frequency unit, for example, a remote radio unit (RRU), may be specifically configured to perform transmission of a radio frequency signal and conversion between a radio frequency signal and a baseband signal, and the one or more antennas may be specifically configured to radiate and receive a radio frequency signal. Optionally, the transceiver 701 may include only the radio frequency unit. In this case, the communication apparatus 700 may include the transceiver 701, the memory 702, the processor 703, and the antenna.

The memory 702 and the processor 703 may be integrated or may be independent of each other. As shown in FIG. 7, the memory 702 and the processor 703 may be integrated into a control unit 710 of the communication apparatus 700. For example, the control unit 710 may include a baseband unit (BBU) of an LTE base station, and the baseband unit may also be referred to as a digital unit (DU), or the control unit 710 may include a distributed unit (DU) and/or a centralized unit (CU) in a base station in 5G or a future radio access technology. The control unit 710 may include one or more boards. A plurality of boards may jointly support a radio access network of a single access standard (for example, an LTE network), or a plurality of boards may separately support radio access networks of different access standards (for example, an LTE network, a 5G network, or another network). The memory 702 and the processor 703 may serve the one or more boards. In other words, the memory 702 and the processor 703 may be independently disposed on each board. Alternatively, the plurality of boards may share the same memory 702 and the same processor 703. In addition, a necessary circuit may be disposed on each board. For example, the circuit may be configured to implement coupling between the memory 702 and the processor 703. The transceiver 701, the processor 703, and the memory 702 may be connected by using a bus structure and/or another connection medium.

Based on the structure shown in FIG. 7, when the communication apparatus 700 needs to send data, the processor 703 may perform baseband processing on the to-be-sent data and output a baseband signal to the radio frequency unit, and the radio frequency unit performs radio frequency processing on the baseband signal and sends a radio frequency signal in an electromagnetic wave form through the antenna. When data is sent to the communication apparatus 700, the radio frequency unit receives a radio frequency signal through the antenna, converts the radio frequency signal into a baseband signal, and outputs the baseband signal to the processor 703. The processor 703 converts the baseband signal into data, and processes the data.

Based on the structure shown in FIG. 7, the transceiver 701 may be configured to perform the foregoing steps performed by the communication module 601, and/or the processor 703 may be configured to invoke instructions in the memory 702 to perform the foregoing steps performed by the processing module 602.

Figure 8:
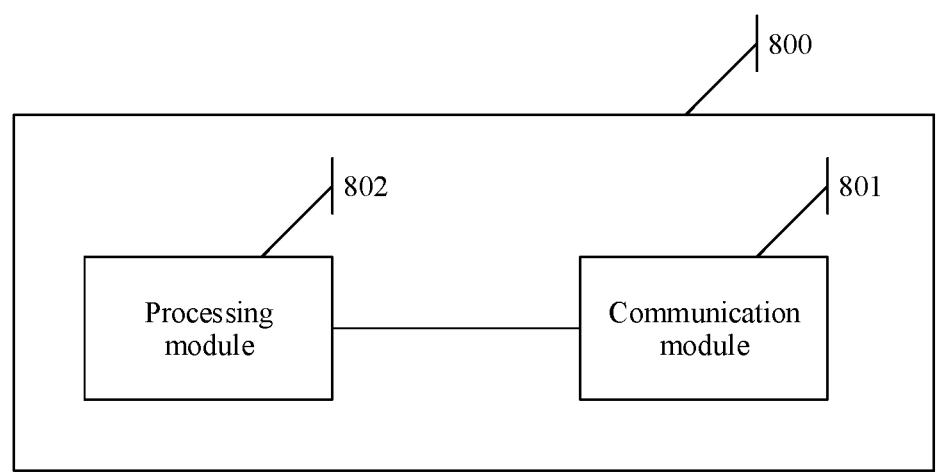
FIG. 8 is a schematic diagram of a structure of another communication apparatus according to an embodiment of the present disclosure.

In a possible implementation, the communication apparatus 800 shown in FIG. 8 may be used as the terminal device 101 in the foregoing method embodiments, and perform the steps performed by the terminal device 101 in the foregoing method embodiments. As shown in FIG. 8, the communication apparatus 800 may include a communication module 801 and a processing module 802. The communication module 801 and the processing module 802 are coupled to each other. The communication module 801 may be configured to support the communication apparatus 800 in performing communication. The communication module 801 may have a wireless communication function, for example, can perform wireless communication with another communication apparatus through a wireless air interface. The processing module 802 may be configured to support the communication apparatus 800 in performing a processing action in the foregoing method embodiments, including but not limited to: generating information and a message that are sent by the communication module 801, and/or demodulating and decoding a signal received by the communication module 801.

When performing the steps performed by the terminal device 101, the communication module 801 may be configured to receive first indication information from a network device, where the first indication information includes configuration information of a PDCCH, the configuration information is used to indicate at least one repeated transmission configuration manner, and the at least one repeated transmission configuration manner includes a first repeated transmission configuration manner. The communication module 801 may be further configured to receive, in each repeated transmission configuration manner, the PDCCH sent by the network device, where the PDCCH is sent in the first repeated transmission configuration manner. Each repeated transmission configuration manner includes at least one of a quantity of repetitions of the PDCCH and an aggregation level that is of the PDCCH and that corresponds to the quantity of repetitions.

The first repeated transmission configuration manner includes a quantity n of repetitions of the PDCCH. The communication module 801 may separately receive, at n time-frequency resource positions, the PDCCH sent by the network device, where n is an integer greater than or equal to 2.

The first indication information further includes search space information, where the search space information is used to determine the n time-frequency resource positions.

The n time-frequency resource positions are determined based on at least one search space and at least one control resource set associated with the at least one search space.

The communication module 801 may perform joint channel decoding on the PDCCH.

The communication module 801 may further separately receive data corresponding to the PDCCH from the network device at n first time-frequency resource positions corresponding to the n time-frequency resource positions through a physical downlink shared channel PDSCH. Alternatively, the communication module 801 may further receive data corresponding to the PDCCH from the network device at a second time-frequency resource position corresponding to the n time-frequency resource positions through a PDSCH.

The first indication information further includes configuration information for repeatedly transmitting the data corresponding to the PDCCH.

When the configuration information is used to indicate that the data corresponding to the PDCCH is separately transmitted at the n first time-frequency resource positions, the communication module 801 may separately receive the data corresponding to the PDCCH from the network device at the n first time-frequency resource positions corresponding to the n time-frequency resource positions through the physical downlink shared channel PDSCH. When the configuration information is used to indicate that the data corresponding to the PDCCH is transmitted at the second time-frequency resource position, the communication module 801 may receive the data corresponding to the PDCCH from the network device at the second time-frequency resource position corresponding to the n time-frequency resource positions through the PDSCH.

The first indication information further includes format information of DCI carried on the PDCCH and/or a first quantity of candidate positions.

The communication apparatus may further include the processing module 802, where the processing module 802 may determine, based on the first quantity of candidate positions, a candidate position for receiving the PDCCH. The communication module 801 may receive the PDCCH based on the candidate position.

Figure 9:
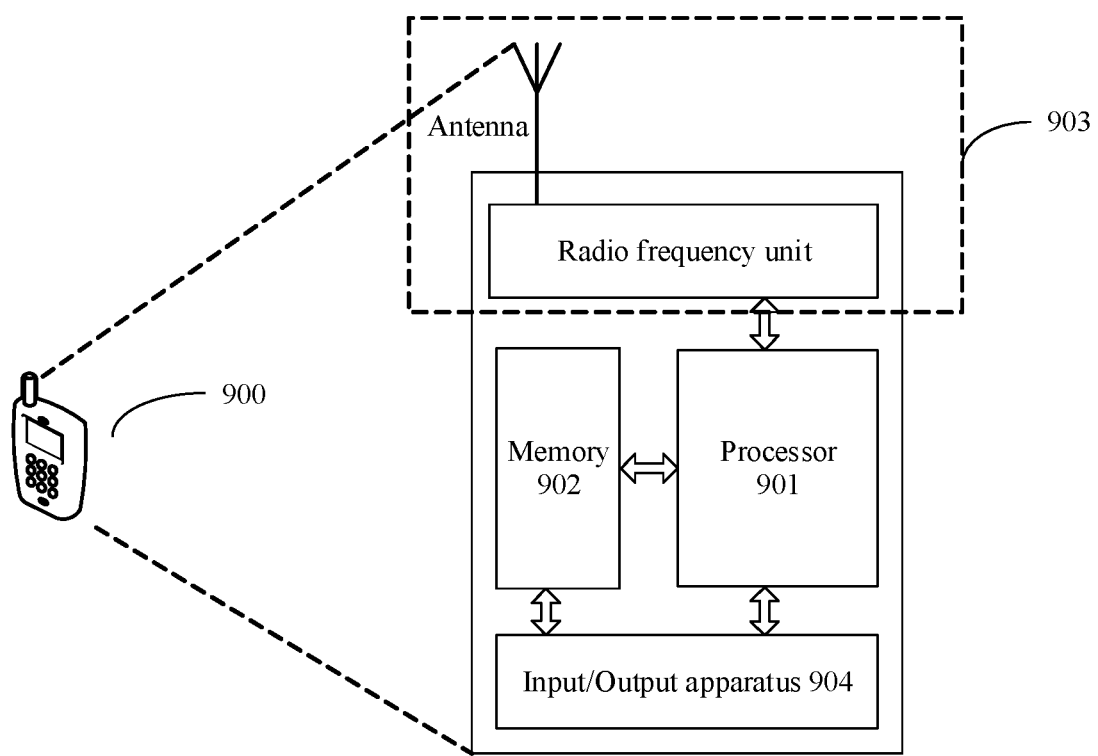
FIG. 9 is a schematic diagram of a structure of another communication apparatus according to an embodiment of the present disclosure.

When the communication apparatus is the terminal device 101, a structure of the communication apparatus may be further shown in FIG. 9. For ease of understanding and illustration, in FIG. 9, that the terminal device 101 is a mobile phone is used as an example to describe the structure of the communication apparatus. As shown in FIG. 9, the communication apparatus 900 may include a processor 901, a memory 902, and a transceiver 903.

The processor 901 may be configured to: process a communication protocol and communication data, control the communication apparatus 900, execute a software program, process data of the software program, and the like. The memory 902 may be configured to store the program and data, and the processor 901 may perform the method performed by the terminal device 101 in the embodiments of the present disclosure based on the program.

The transceiver 903 may include a radio frequency unit and an antenna. The radio frequency unit may be configured to: perform conversion between a baseband signal and a radio frequency signal, and process the radio frequency signal. The antenna may be configured to send and receive a radio frequency signal in an electromagnetic wave form. In addition, only the radio frequency unit may be considered as the transceiver 903. In this case, the communication apparatus 900 may include the processor 901, the memory 902, the transceiver 903, and the antenna.

In addition, the communication apparatus 900 may further include an input/output apparatus 904, for example, a touchscreen, a display screen, a keyboard, or another component that may be configured to receive data input by a user and output data to the user. It should be noted that some communication apparatuses may not have the input/output apparatus.

Based on the structure shown in FIG. 9, when the communication apparatus 900 needs to send data, the processor 901 may perform baseband processing on the to-be-sent data and output a baseband signal to the radio frequency unit, and the radio frequency unit performs radio frequency processing on the baseband signal and sends a radio frequency signal in an electromagnetic wave form through the antenna.

When data is sent to the communication apparatus 900, the radio frequency unit receives a radio frequency signal through the antenna, converts the radio frequency signal into a baseband signal, and outputs the baseband signal to the processor 901. The processor 901 converts the baseband signal into data, and processes the data.

For example, the communication apparatus 900 may be configured to perform the foregoing steps performed by the terminal device 101. Specifically, the transceiver 903 may be configured to perform the foregoing steps performed by the communication module 801, and/or the processor 901 may be configured to invoke instructions stored in the memory 902 to perform the foregoing steps performed by the processing module 802.

Based on a same concept as the foregoing embodiments, an embodiment of the present disclosure further provides a computer-readable storage medium. The computer-readable storage medium stores some instructions. When the instructions are invoked and executed, a computer may be enabled to perform the steps performed by the network device 102 and/or the terminal device 101 in any one of the foregoing method embodiments or the possible implementations of the method embodiments. The readable storage medium is not limited in this embodiment of the present disclosure. For example, the readable storage medium may be a RAM (random access memory) or a ROM (read-only memory).

Based on a same concept as the foregoing method embodiments, an embodiment of the present disclosure further provides a computer program product. When the computer program product is run by a computer, the computer may be enabled to perform the steps performed by the network device 102 and/or the terminal device 101 in any one of the foregoing method embodiments or the possible implementations of the method embodiments.

Based on a same concept as the foregoing method embodiments, an embodiment of the present disclosure further provides a communication apparatus. The communication apparatus may include the network device 102 and/or the terminal device 101 provided in the embodiments of the present disclosure.

For example, in the communication system, the network device 102 may send first indication information to the terminal device 101, where the first indication information may include configuration information of a PDCCH, the configuration information is used to indicate at least one repeated transmission configuration manner, and the at least one repeated transmission configuration manner includes a first repeated transmission configuration manner. Correspondingly, the terminal device 101 may receive the first indication information. The network device 102 may further send the PDCCH to the terminal device 101 based on the first repeated transmission configuration manner. Correspondingly, the terminal device 101 may receive, based on each repeated transmission configuration manner, the PDCCH sent by the network device 102. The repeated transmission configuration manner may include at least one of a quantity of repetitions of the PDCCH and an aggregation level that is of the PDCCH and that corresponds to the quantity of repetitions.

Based on a same concept as the foregoing method embodiments, an embodiment of the present disclosure further provides a chip. The chip may include a processor, and the processor may be coupled to a transceiver. The chip may be configured by a first device or a second device to implement functions related to the network device 102 and/or the terminal device 101 in any one of the foregoing method embodiments or the possible designs of the method embodiments.

In addition, an embodiment of the present disclosure further provides a chip system. The chip system may include the foregoing chip, or may include a chip and another discrete component. For example, the chip system may include a chip, a memory, and a communication module. The chip system may be configured to implement the network device 102 and/or the terminal device 101.

It should be understood that the processor or the processing module related to the foregoing embodiments may be a general-purpose processor, a digital signal processor, an application-specific integrated circuit, a field programmable gate array or another programmable logic device, a discrete gate or a transistor logic device, or a discrete hardware component, which can implement or perform the methods, steps, and logical block diagrams disclosed in the embodiments of the present disclosure. The general-purpose processor may be a microprocessor, any conventional processor, or the like. The steps in the methods disclosed with reference to the embodiments of the present disclosure may be directly performed by a hardware processor, or may be performed by a combination of hardware in the processor and a software module.

The memory may be a nonvolatile memory, for example, a hard disk drive (HDD) or a solid-state drive (SSD), or may be a volatile memory, for example, a random access memory (RAM). The memory is any other medium that can be used to carry or store expected program code in an instruction form or a data structure form and that can be accessed by a computer. However, the memory not limited thereto. The memory in the embodiments of the present disclosure may alternatively be a circuit or any other apparatus that can implement a storage function, and is configured to store program instructions and/or data.

The transceiver or the communication module may be a circuit, a component, a communication interface, a bus, a software module, a wireless transceiver, or any other component that can implement information/data receiving and sending.

All or some of the foregoing embodiments may be implemented by using software, hardware (for example, a circuit), firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedure or functions according to the embodiments of the present disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk drive, or a magnetic tape), an optical medium (for example, a DVD), or a semiconductor medium. The semiconductor medium may be a solid-state drive. FIG. 9

What is claimed is:

1. A physical downlink control channel (PDCCH) transmission method, comprising:
sending, by a network device, first indication information to a terminal device, wherein the first indication information comprises configuration information of a PDCCH, the configuration information indicates at least one repeated transmission configuration manner, and the at least one repeated transmission configuration manner comprises a first repeated transmission configuration manner comprising a quantity of n repetitions of the PDCCH, wherein n is an integer greater than or equal to 2; and
sending, by the network device, the PDCCH to the terminal device in the first repeated transmission configuration manner, including separately sending, the PDCCH at n time-frequency resource positions,
wherein each repeated transmission configuration manner comprises at least one of a quantity of repetitions of the PDCCH or an aggregation level of the PDCCH and that corresponds to the quantity of repetitions.

2. The method according to claim 1, wherein the first indication information further comprises search space information, wherein the search space information is used to determine the n time-frequency resource positions.

3. The method according to claim 1, wherein the n time-frequency resource positions are determined based on at least one search space and at least one control resource set associated with the at least one search space.

4. The method according to claim 1, wherein in response to the n time-frequency resource positions being located in different slots, the sending, by the network device, the PDCCH to the terminal device in the first repeated transmission configuration manner comprises:
performing, by the network device, independent channel encoding on each PDCCH; or
in response to the n time-frequency resource positions being located in a same slot, the sending, by the network device, the PDCCH to the terminal device in the first repeated transmission configuration manner comprises:
performing, by the network device, joint channel encoding on the PDCCH.

5. A physical downlink control channel (PDCCH) transmission method, comprising:
receiving, by a terminal device, first indication information from a network device, wherein the first indication information comprises configuration information of a PDCCH, the configuration information indicates at least one repeated transmission configuration manner, and the at least one repeated transmission configuration manner comprises a first repeated transmission configuration manner comprising a quantity of n repetitions of the PDCCH, wherein n is an integer greater than or equal to 2; and
receiving, by the terminal device in each repeated transmission configuration manner, the PDCCH sent by the network device, wherein the PDCCH is sent in the first repeated transmission configuration manner, including the PDCCH being sent separately, at n time-frequency resource positions,
wherein each repeated transmission configuration manner comprises at least one of a quantity of repetitions of the PDCCH or an aggregation level of the PDCCH and that corresponds to the quantity of repetitions.

6. The method according to claim 1, further comprising:
separately sending, by the network device, data corresponding to the PDCCH to the terminal device at n first time-frequency resource positions corresponding to the n time-frequency resource positions through a physical downlink shared channel (PDSCH).

7. The method according to claim 5, wherein in response to the n time-frequency resource positions being located in different slots, the receiving, by the terminal device, the PDCCH sent by the network device in the first repeated transmission configuration manner comprises:
performing, by the terminal device, independent channel decoding on each PDCCH.

8. The method according to claim 5, wherein the first indication information further comprises search space information, wherein the search space information is used to determine the n time-frequency resource positions.

9. The method according to claim 5, wherein the n time-frequency resource positions are determined based on at least one search space and at least one control resource set associated with the at least one search space.

10. The method according to claim 5, wherein the receiving, by the terminal device in each repeated transmission configuration manner, the PDCCH sent by the network device comprises:
performing, by the terminal device, joint channel decoding on the PDCCH.

11. The method according to claim 5, further comprising:
separately receiving, by the terminal device, data corresponding to the PDCCH from the network device at n first time-frequency resource positions corresponding to the n time-frequency resource positions through a physical downlink shared channel (PDSCH).

12. A communication apparatus, comprising:
a transceiver configured to send first indication information to a terminal device, wherein the first indication information comprises configuration information of a physical downlink control channel (PDCCH), the configuration information indicates at least one repeated transmission configuration manner, and the at least one repeated transmission configuration manner comprises a first repeated transmission configuration manner comprising a quantity of n repetitions of the PDCCH, wherein n is an integer greater than or equal to 2,
wherein the transceiver is further configured to send the PDCCH to the terminal device in the first repeated transmission configuration manner, including separately sending, the PDCCH at n time-frequency resource positions, and
wherein each repeated transmission configuration manner comprises at least one of a quantity of repetitions of the PDCCH or an aggregation level of the PDCCH and that corresponds to the quantity of repetitions.

13. The communication apparatus according to claim 12, wherein the first indication information further comprises search space information, wherein the search space information is used to determine the n time-frequency resource positions.

14. The communication apparatus according to claim 12, wherein the n time-frequency resource positions are determined based on at least one search space and at least one control resource set associated with the at least one search space.

15. The communication apparatus according to claim 13, wherein the communication apparatus further comprises a processor configured to:
in response to the n time-frequency resource positions are located in different slots, the transceiver is specifically configured to:
perform independent channel encoding on each PDCCH; or
in response to the n time-frequency resource positions are located in a same slot, the transceiver is specifically configured to:
perform joint channel encoding on the PDCCH.

16. A communication apparatus, comprising:
a transceiver, configured to receive first indication information from a network device, wherein the first indication information comprises configuration information of a physical downlink control channel (PDCCH), the configuration information indicates at least one repeated transmission configuration manner, and the at least one repeated transmission configuration manner comprises a first repeated transmission configuration manner comprising a quantity of n repetitions of the PDCCH, wherein n is an integer greater than or equal to 2,
wherein the transceiver is further configured to receive, in each repeated transmission configuration manner, the PDCCH sent by the network device, wherein the PDCCH is sent in the first repeated transmission configuration manner, including the PDCCH being sent separately, at n time-frequency resource positions, and wherein each repeated transmission configuration manner comprises at least one of a quantity of repetitions of the PDCCH or an aggregation level of the PDCCH and that corresponds to the quantity of repetitions.

17. The communication apparatus according to claim 16, wherein the first indication information further comprises search space information, wherein the search space information is used to determine the n time-frequency resource positions.

18. The communication apparatus according to claim 16, wherein
the n time-frequency resource positions are determined based on at least one search space and at least one control resource set associated with the at least one search space.

19. The communication apparatus according to claim 16, wherein the communication apparatus further comprises a processor configured to:
perform joint channel decoding on the PDCCH.

20. The communication apparatus according to claim 16, wherein the communication apparatus further comprises a processor configured to:
in response to the n time-frequency resource positions being located in different slots, and in receiving the PDCCH sent by the network device in the first repeated transmission configuration manner, perform, independent channel encoding on each PDCCH.

* * * * *